(12) United States Patent
Horio et al.

(10) Patent No.: US 7,630,329 B2
(45) Date of Patent: Dec. 8, 2009

(54) COMMUNICATION METHOD, COMMUNICATION SYSTEM, AND CONNECTION APPARATUS

(75) Inventors: Kenichi Horio, Kawasaki (JP); Takashi Ohno, Kawasaki (JP); Satoshi Okuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 184 days.

(21) Appl. No.: 11/394,102

(22) Filed: Mar. 31, 2006

(65) Prior Publication Data

US 2007/0160192 A1 Jul. 12, 2007

(30) Foreign Application Priority Data

Dec. 27, 2005 (JP) ............................. 2005-376109

(51) Int. Cl.
*H04L 12/16* (2006.01)
(52) U.S. Cl. ...................................... 370/261; 455/519
(58) Field of Classification Search .............. 379/93.01, 379/93.21; 370/260, 312, 261; 455/518, 455/519
See application file for complete search history.

(56) References Cited

U.S. PATENT DOCUMENTS

| 6,477,150 | B1 * | 11/2002 | Maggenti et al. | ............ 370/312 |
| 6,798,755 | B2 * | 9/2004 | Lillie et al. | .................. 370/312 |
| 7,324,505 | B2 * | 1/2008 | Hoover | ....................... 370/352 |
| 7,415,282 | B2 * | 8/2008 | Tillet et al. | ................... 455/509 |
| 2003/0016632 | A1 * | 1/2003 | Refai et al. | .................. 370/260 |
| 2004/0190489 | A1 * | 9/2004 | Palaez et al. | ................. 370/351 |
| 2004/0228292 | A1 * | 11/2004 | Edwards | ...................... 370/277 |
| 2005/0180394 | A1 * | 8/2005 | Kautz et al. | .................. 370/352 |
| 2006/0008078 | A1 * | 1/2006 | El-Fishawy | .................. 379/432 |
| 2006/0040691 | A1 * | 2/2006 | Diep et al. | ................... 455/518 |
| 2006/0056320 | A1 * | 3/2006 | Gatts | ......................... 370/276 |
| 2006/0116149 | A1 * | 6/2006 | Dunn et al. | .................. 455/518 |
| 2006/0221968 | A1 * | 10/2006 | Razdan et al. | ............. 370/392 |
| 2006/0229093 | A1 * | 10/2006 | Bhutiani et al. | ............. 455/518 |
| 2007/0004438 | A1 * | 1/2007 | Brusilovsky et al. | ........ 455/518 |
| 2007/0021136 | A1 * | 1/2007 | Allen | ......................... 455/518 |
| 2007/0105578 | A1 * | 5/2007 | Shaffer et al. | ............... 455/518 |
| 2007/0133435 | A1 * | 6/2007 | Eneroth et al. | .............. 370/260 |

FOREIGN PATENT DOCUMENTS

| JP | 2005-102033 | 4/2005 |
| JP | 2005-234666 | 9/2005 |

* cited by examiner

*Primary Examiner*—Olisa Anwah
(74) *Attorney, Agent, or Firm*—Staas & Halsey LLP

(57) ABSTRACT

A connection apparatus is employed which is connected to a repeating apparatus for providing the PoC for first communication apparatuses having a PoC function. Call connection is established between the connection apparatus and second communication apparatus not having the PoC function. In the connection apparatus, recorded is apparatus information for identifying each second communication apparatus. The connection apparatus has the function of acting as a proxy of the second communication apparatus identified by the apparatus information. This function consists of the function of performing half duplex communication with the repeating apparatus; the function of transmitting output data received from the second communication apparatus, to the repeating apparatus when the second communication apparatus has acquired transmission right; and the function of transmitting received output data to the second communication apparatus when the output data is received from the repeating apparatus.

29 Claims, 19 Drawing Sheets

| PoC No. | START TIME | GROUPING STATUS | APP. INFORMATION | COMMUNICATION STATUS |
|---|---|---|---|---|
| 1 | 10:00 | STARTED | tel03xxxxxx1 | ON THE LINE |
| | | | tel03xxxxxx2 | WAITING |
| | | | PoC1 | — |
| 2 | — | NOT YET | tel03xxxxxx3 | WAITING |
| | | | PoC2 | — |

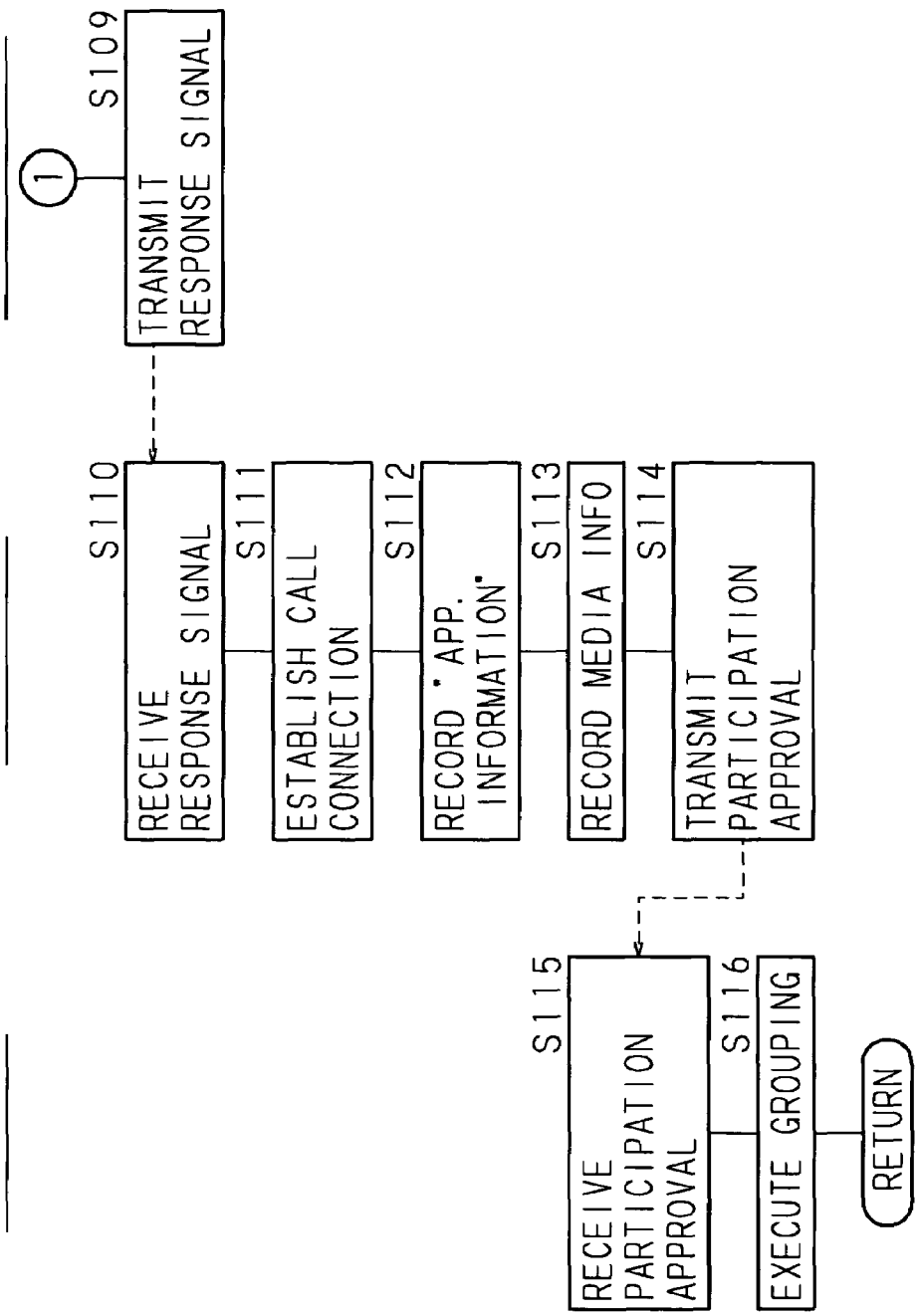

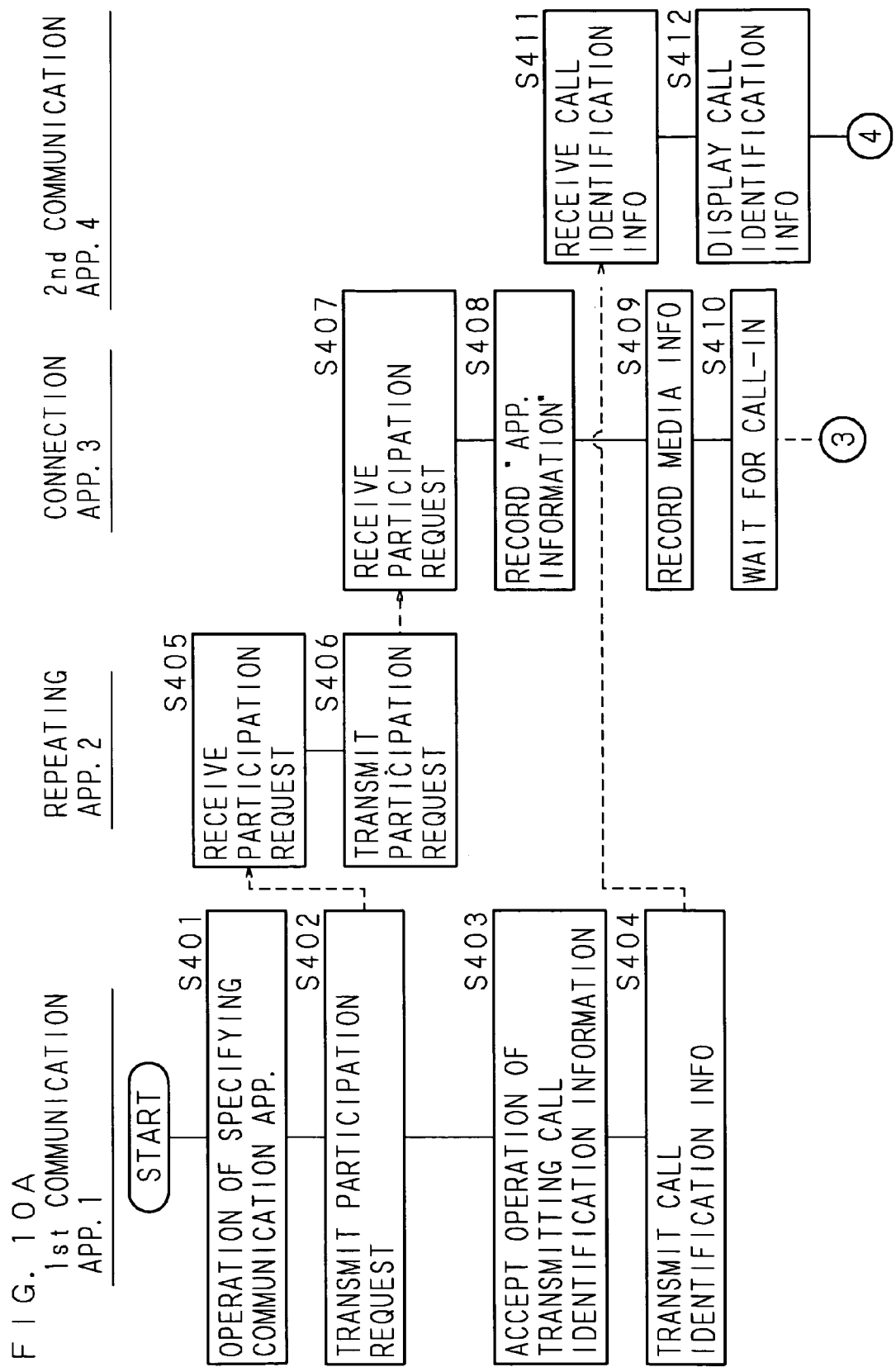

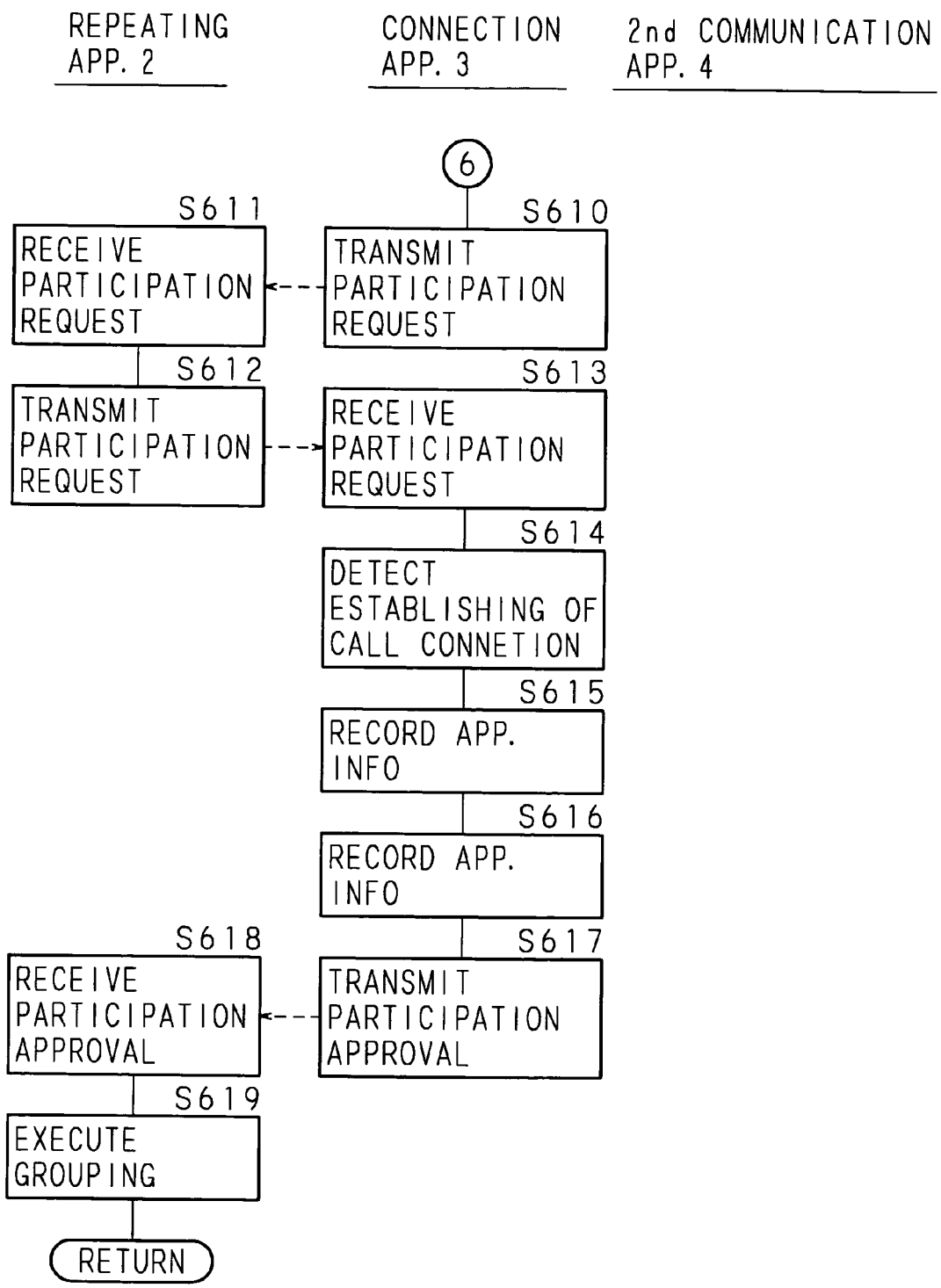

COMMUNICATION METHOD, COMMUNICATION SYSTEM, AND CONNECTION APPARATUS

CROSS-REFERENCE TO RELATED APPLICATIONS

This Nonprovisional application claims priority under 35 U.S.C. §119(a) on Patent Application No. 2005-376109 filed in Japan on Dec. 27, 2005, the entire contents of which are hereby incorporated by reference.

BACKGROUND OF THE INVENTION

1. Field of the Invention

The present invention relates to: a communication method employing a repeating apparatus that is capable of relaying communication among a plurality of apparatuses capable of performing half duplex communication and that performs multi-address calling of data received from one apparatus having acquired transmission right, to the other apparatuses having been grouped with said one apparatus; a communication system employing such communication method; and a connection apparatus employed in such communication system. In particular, the present invention relates to a communication method, a communication system, and a connection apparatus applicable to a PoC (Push-to-Talk over Cellular) service in which the technique of IP (Internet Protocol) telephone is utilized in a manner similar to transceivers so that a packet containing voice data is transmitted to a plurality of apparatuses by multi-address calling.

2. Description of Related Art

Recently, the use of real-time applications such as VoIP (Voice over Internet Protocol), VoPN (Voice over Packet Network), and streaming or the like is increasing in which audio and video data are transmitted and received between apparatuses via a communication network such as an IP (Internet Protocol) network. Thus, IP telephone serving as an example is spreading rapidly. In the IP telephone, packeted voice data is transmitted and received via an IP network so that telephone call is realized between an apparatus on the packet transmitting side and an apparatus on the packet receiving side.

Further, attention is focused on a PoC (Push-to-Talk over Cellular) service in which the technique of IP (Internet Protocol) telephone is utilized in a manner similar to transceivers so that a packet containing voice data is transmitted to a plurality of apparatuses by multi-address calling. A feature of the PoC service is that half duplex communication is adopted in which one apparatus among a plurality of apparatuses acquires transmission right for transmitting voice data and then this one apparatus having acquired the transmission right performs multi-address calling of voice data to a plurality of the other apparatuses. This permits simultaneous communication among three or more apparatuses. Here, at the time of transmission of the voice data, which apparatus (user) has presently the transmission right is notified to each apparatus. This allows all members to understand who is providing the speech presently outputted on the basis of the voice data (see, for example, Japanese Patent Application Laid-Open No. 2005-102033).

As such, in a system that realizes one-to-a-plurality conversation by means of multi-address calling of voice data from one apparatus having acquired transmission right to a plurality of the other apparatuses similarly in the PoC service, time, effort, and cost are reduced that is necessary for transmitting the same contents to each person. Further, even in a case where a speech is intrinsically directed to a specific person, when a speaking person having acquired transmission right transmits the contents also to the other persons by multi-address calling, the information is shared among all the members including the persons other than the intrinsic target person of the speech. This is another advantage.

Nevertheless, although dedicated terminal devices are necessary for the use of the PoC service, there is a problem that dedicated terminal devices are not spreading widely at present. In order to use the dedicated terminals, corresponding financial burden such as purchase expense obviously arises. This causes a difficulty in the use of the PoC service, hence prevents increase in the name recognition of the PoC service itself and its advantage, and thereby causes a problem that the PoC service does not spread widely.

BRIEF SUMMARY OF THE INVENTION

The present invention has been devised in view of such circumferences. An object of the present invention is to allow already-widely-spreading apparatuses to utilize the PoC service, and thereby to increase the name recognition of the PoC service so as to accelerate the spread of the PoC service.

Briefly speaking, in the present invention, a connection apparatus is employed that connects already-widely-spreading ordinary telephone terminals capable of performing full duplex communication, to a PoC server computer for providing the PoC service. Then, the connection apparatus acts as a proxy of a PoC service communication apparatus when viewed from the PoC server computer, while the connection apparatus provides virtual half duplex communication to the ordinary telephone terminals. This allows already-widely-spreading apparatuses to utilize the PoC service.

A communication method according to the present invention is a communication method employing a repeating apparatus which can relay communication among a plurality of first communication apparatuses capable of performing half duplex communication, and which performs multi-address calling of output data received from one communication apparatus having acquired transmission right, to the other communication apparatuses having been grouped with the one communication apparatus, and is characterized in that the communication method further employs at least one second communication apparatus capable of performing full duplex communication with an apparatus to which call connection has been established and a connection apparatus connected to the repeating apparatus, and the communication method comprises the steps of by the connection apparatus, establishing call connection in full duplex communication to a second communication apparatus; by the connection apparatus, performing communication with the repeating apparatus as a proxy of the second communication apparatus having been grouped by establishing the call connection; by the connection apparatus, transmitting output data received from the second communication apparatus to the repeating apparatus, when the grouped second communication apparatus has acquired transmission right; and by the connection apparatus, transmitting the received output data to the second communication apparatus, when the connection apparatus receives output data from the repeating apparatus.

According to the communication method of the present invention, the connection apparatus described above is employed so that a multiple address communication service such as the PoC service is achieved by adopting an ordinary type portable telephone terminal as the second communication apparatus. This improves the name recognition of the PoC service, and thereby accelerates the spread of the PoC service.

A first aspect of a communication system according to the present invention is a communication system comprising a repeating apparatus which can relay communication among a plurality of first communication apparatuses capable of performing half duplex communication, and which performs multi-address calling of output data received from one communication apparatus having acquired transmission right, to the other communication apparatuses having been grouped with the one communication apparatus, and is characterized by including: at least one second communication apparatus capable of performing full duplex communication of output data with a communication apparatus to which call connection has been established; and a connection apparatus connected to the repeating apparatus, wherein the connection apparatus comprises: apparatus information recording means for recording apparatus information for identifying a second communication apparatus to which call connection has been established, as apparatus information of a grouped apparatus; means for performing communication with the repeating apparatus as a proxy of the second communication apparatus identified by the apparatus information recorded in the apparatus information recording means; means for transmitting to the repeating apparatus output data received from the second communication apparatus, when the second communication apparatus has acquired transmission right; and means for transmitting received output data to the second communication apparatus, when the output data is received from the repeating apparatus.

According to the communication system of the first aspect of the present invention, a connection apparatus described above is employed so that a multiple address communication service such as the PoC service is achieved by adopting an ordinary type portable telephone terminal as the second communication apparatus. This improves the name recognition of the PoC service, and thereby accelerates the spread of the PoC service.

A second aspect of the communication system according to the present invention is, in the first aspect, characterized in that the output data is voice data for outputting voice.

According to the second aspect of the communication system of the present invention, in the first aspect, since the output data is voice data, ordinary type portable telephone terminals or the like can be used as transceivers.

A third aspect of the communication system according to the present invention is, in the first aspect, characterized in the first communication apparatus and the repeating apparatus transmit and receive the output data via an IP network.

According to the third aspect of the communication system of the present invention, in the first aspect, communication between the first communication apparatuses and the repeating apparatus is performed by half duplex communication.

A fourth aspect of the communication system according to the present invention is, in the first aspect, characterized in the second communication apparatus establishes call connection to the connection apparatus via a line switching network.

According to the fourth aspect of the communication system of the present invention, in the first aspect, communication between the second communication apparatus and the connection apparatus via the line switching network is performed by full duplex communication so that call connection is established.

A fifth aspect of the communication system according to the present invention is, in the first aspect, characterized in that the second communication apparatus establishes call connection to the connection apparatus via a virtual communication line being set up on a packet switching network.

According to the fifth aspect of the communication system of the present invention, in the first aspect, in a case where the second communication apparatus is an IP telephone terminal connected via a packet switching network, call connection is established through a virtual communication line that is set up on the packet switching network.

A sixth aspect of the communication system according to the present invention is, in the first aspect, characterized in that the connection apparatus further comprises means for converting the format of the output data.

According to the sixth aspect of the communication system of the present invention, in the first aspect, when the protocol used between the connection apparatus and the repeating apparatus is different from the protocol used between the connection apparatus and the second communication apparatus, the format of the output data is changed by the repeating apparatus.

A seventh aspect of the communication system according to the present invention is, in the first aspect, characterized in that the repeating apparatus comprises means for transmitting a participation request to the connection apparatus to be the proxy of the specified second communication apparatus, when the participation request is received for requesting participation into the group with specifying one or a plurality of communication apparatuses including a second communication apparatus, the connection apparatus further comprises: means for executing call processing for the second communication apparatus specified by the received participation request; means for establishing call connection to the second communication apparatus, when a response to the call processing is received from the second communication apparatus; means for recording apparatus information for identifying the second communication apparatus to which call connection has been established, into the apparatus information recording means as a communication apparatus to be participated into the group; and means for transmitting to the repeating apparatus a participation approval for approving participation of the second communication apparatus into the group, and the repeating apparatus further comprises means for executing grouping on the basis of the received participation approval.

According to the seventh aspect of the communication system of the present invention, in the first aspect, in response to a participation request transmitted from the repeating apparatus, even the second communication apparatus not having a function concerning grouping can be grouped as a communication apparatus for the PoC service.

An eighth aspect of the communication system according to the present invention is, in the first aspect, characterized in that the first communication apparatus comprises: means for transmitting to the repeating apparatus a participation request for requesting participation into a group with specifying one or a plurality of communication apparatuses including at least one second communication apparatus; and means for transmitting call identification information necessary for call for the connection apparatus, to the specified second communication apparatus, the repeating apparatus comprises means for transmitting the received participation request to the connection apparatus to be the proxy of the specified second communication apparatus, the second communication apparatus having received the call identification information comprises means for executing call processing for the connection apparatus on the basis of the received call identification information, the connection apparatus further comprises: means for establishing call connection to the second communication apparatus in response to the call processing from the second communication apparatus specified by the participation request received from the repeating apparatus; means for recording apparatus information for identifying the second communication apparatus to which call connection has been established, into the apparatus information recording means as a communication apparatus to be participated into the group; and means for transmitting to the repeating apparatus a participation approval for approving participation of the second communication apparatus into the group, and the repeating apparatus further comprises means for executing grouping on the basis of the received participation approval.

According to the eighth aspect of the communication system of the present invention, in the first aspect, in response to a participation request transmitted from the first communication apparatus via the repeating apparatus, even the second communication apparatus not having a function concerning grouping can be grouped as a communication apparatus for the PoC service.

A ninth aspect of the communication system according to the present invention is, in the first aspect, characterized in that the connection apparatus further comprises means for transmitting the received participation request to the repeating apparatus when the participation request for requesting participation into a group with specifying a plurality of communication apparatuses including a second communication apparatus is received not via the repeating apparatus, the repeating apparatus comprises means for transmitting the received participation request to the connection apparatus to be the proxy of the specified second communication apparatus, the connection apparatus further comprises: means for executing call processing for the second communication apparatus specified by the received participation request; means for establishing call connection to the second communication apparatus when a response to the call processing is received from the second communication apparatus; means for recording apparatus information for identifying the second communication apparatus to which call connection has been established, into the apparatus information recording means as a communication apparatus to be participated into the group; and means for transmitting to the repeating apparatus a participation approval for approving participation of the second communication apparatus into the group, and the repeating apparatus further comprises means for executing grouping on the basis of the received participation approval.

A tenth aspect of the communication system according to the present invention is, in the ninth aspect, characterized in that the connection apparatus receives the participation request via a web server computer.

According to the ninth and the tenth aspects of the communication system of the present invention, in the first aspect, when the connection apparatus receives a participation request via a computer such as a web server computer connected to a packet switching network such as the Internet, a plurality of communication apparatuses including a second communication apparatus can be grouped. Accordingly, grouping request from an ordinary type communication apparatus having the function of being connected to a packet network can be achieved. As a result, the second communication apparatus not having a function concerning grouping can be grouped as a communication apparatus for the PoC service.

An eleventh aspect of the communication system according to the present invention is, in the first aspect, characterized in that the second communication apparatus comprises: means for transmitting a participation request for requesting participation into a group with specifying a plurality of apparatuses including itself, to the connection apparatus to which call connection is not yet established; and means for executing call processing for the connection apparatus, the connection apparatus further comprises: means for establishing call connection to the second communication apparatus in response to the call processing from the second communication apparatus; and means for transmitting the received participation request to the repeating apparatus, the repeating apparatus comprises means for transmitting the participation request to the connection apparatus to be the proxy of the second communication apparatus specified by the received participation request, the connection apparatus further comprises: means for recording the second communication apparatus which is specified by the received participation request and to which call connection has been establishes, into the apparatus information recording means as a communication apparatus to be participated into the group; and means for transmitting to the repeating apparatus a participation approval for approving participation of the second communication apparatus into the group, and the repeating apparatus further comprises: means for transmitting the participation request to the communication apparatuses specified by the received participation request; and means for executing grouping on the basis of the received participation approval.

A twelfth aspect of the communication system according to the present invention is, in the eleventh aspect, characterized in that the second communication apparatus transmits the participation request to the connection apparatus via a web server computer.

According to the eleventh and the twelfth aspects of the communication system of the present invention, in the first aspect, when the connection apparatus receives a participation request via a computer such as a web server computer connected to a packet switching network such as the Internet and when call connection is established to the second communication apparatus, a plurality of communication apparatuses including a second communication apparatus can be grouped. Accordingly, grouping request from an ordinary type communication apparatus having the function of being connected to a packet network can be achieved. As a result, the second communication apparatus not having a function concerning grouping can be grouped as a communication apparatus for the PoC service.

A thirteenth aspect of the communication system according to the present invention is, in the first aspect, characterized in that the second communication apparatus comprises means for transmitting a participation request for requesting participation into a group with specifying a plurality of communication apparatuses including itself, to the repeating apparatus not via the connection apparatus, the repeating apparatus comprises means for transmitting the participation request to the connection apparatus to be the proxy of the second communication apparatus specified by the received participation request, the connection apparatus further comprises: means for executing call processing for the second communication apparatus specified by the received participation request; means for establishing call connection to the second communication apparatus, when a response to the call processing is received from the second communication apparatus; means for recording apparatus information for identifying the second communication apparatus to which call connection has been established, into the apparatus information recording means as a communication apparatus to be participated into the group; and means for transmitting to the repeating apparatus a participation approval for approving participation of the second communication apparatus into the group, and the repeating apparatus further comprises means for executing grouping on the basis of the received participation approval.

A fourteenth aspect of the communication system according to the present invention is, in the thirteenth aspect, characterized in that the second communication apparatus transmits the participation request to the repeating apparatus via a web server computer.

According to the thirteenth and the fourteenth aspects of the communication system of the present invention, in the first aspect, when the repeating apparatus receives a participation request via a computer such as a web server computer connected to a packet switching network such as the Internet, a plurality of communication apparatuses including a second communication apparatus can be grouped. Thus, even the second communication apparatus having the function of being connected to a communication network but not having a function concerning grouping can be grouped as a communication apparatus for the PoC service.

A fifteenth aspect of the communication system according to the present invention is, in the first aspect, characterized in that the connection apparatus further comprises means for transmitting, to the second communication apparatus, participation notice output data for causing the second communication apparatus to generate output indicating as having participated into the group.

According to the fifteenth aspect of the communication system of the present invention, in the first aspect, when the second communication apparatus participates into the group, guidance indicating this situation is outputted in the form of display, voice, or the like.

A sixteenth aspect of the communication system according to the present invention is, in the first aspect, characterized in that the connection apparatus further comprises means for transmitting to the repeating apparatus a transmission right request for requesting transmission right for the second communication apparatus, when output data at an output level exceeding a predetermined threshold or alternatively a predetermined command for requesting transmission right is received from the second communication apparatus.

According to the sixteenth aspect of the communication system of the present invention, in the first aspect, when the connection apparatus transmits a transmission right request on the basis of the output data received from the second communication apparatus or alternatively a predetermined command for requesting transmission right, the second communication apparatus intrinsically not having the function of requesting transmission right can be used as a communication apparatus for a PoC service having the function of requesting transmission right.

A seventeenth aspect of the communication system according to the present invention is, in the sixteenth aspect, characterized in that the connection apparatus further comprises means for transmitting to the repeating apparatus a transmission right release request for releasing transmission right for the second communication apparatus, when output data at an output level below a predetermined threshold or alternatively a predetermined command for releasing the transmission right is received from the second communication apparatus having acquired transmission right.

According to the seventeenth aspect of the communication system of the present invention, in the sixteenth aspect, even when the second communication apparatus intrinsically not having the function of transmission right release request can be used as a communication apparatus for a PoC service having the function of transmission right release request.

An eighteenth aspect of the communication system according to the present invention is, in the first aspect, characterized in that the connection apparatus further comprises: means for detecting call disconnection of the grouped second communication apparatus; means for deleting from the apparatus information recording means the apparatus information for identifying the second communication apparatus to which call disconnection has been performed; and means for transmitting to the repeating apparatus a cancellation request for requesting grouping cancellation.

According to the eighteenth aspect of the communication system of the present invention, in the first aspect, the connection apparatus transmits a cancellation request on the basis of a predetermined command for requesting the cancellation received from the second communication apparatus or alternatively on the basis of call disconnection. By virtue of this, even the second communication apparatus not having the function of grouping cancellation can be used as a communication apparatus for a PoC service having the function of grouping cancellation.

A connection apparatus according to the present invention is a connection apparatus connected to a repeating apparatus which can relay communication among a plurality of first communication apparatuses capable of performing half duplex communication, and which performs multi-address calling of output data received from one communication apparatus having acquired transmission right, to the other communication apparatuses having been grouped with the one communication apparatus, and is characterized by comprising: means for establishing call connection to at least one second communication apparatus capable of performing full duplex communication; apparatus information recording means for recording apparatus information for identifying a second communication apparatus to which call connection has been established, as apparatus information of a grouped apparatus; means for performing communication with the repeating apparatus as a proxy of the second communication apparatus identified by the apparatus information recorded in the apparatus information recording means; means for transmitting to the repeating apparatus output data received from the second communication apparatus, when the second communication apparatus has acquired transmission right; and means for transmitting received output data to the second communication apparatus, when the output data is received from the repeating apparatus.

According to the connection apparatus of the present invention, a multiple address communication service such as the PoC service is achieved by adopting an ordinary type portable telephone terminal as the second communication apparatus. This improves the name recognition of the PoC service, and thereby accelerates the spread of the PoC service.

As described above, in the communication method and the communication system according to the present invention, a repeating apparatus such as a PoC server computer is employed so that each second communication apparatus is connected to the repeating apparatus via a connection apparatus according to the present invention in order that the PoC service intrinsically provided to first communication apparatuses having a transceiver function should become available also for second communication apparatuses such as ordinary type portable telephone terminals not having a transceiver function. Here, the connection apparatus and each second communication apparatus are connected to each other by call connection through a speech path being set up when call processing is performed when one apparatus generates a call to another apparatus. In the connection apparatus, apparatus information is recorded for specifying a second communication apparatus. The connection apparatus has the function of acting as a proxy of the second communication apparatus identified by the apparatus information. Specifically, this is the function of performing half duplex communication with the repeating apparatus; then transmitting output data received from the second communication apparatus, to the repeating apparatus when the second communication apparatus has acquired transmission right; and then transmitting received output data to the second communication apparatus when the output data is received from the repeating apparatus.

By virtue of the function of the repeating apparatus according to the present invention described above, the PoC service becomes available for ordinary type second communication apparatuses intrinsically not having a function concerning the PoC. This improves the name recognition of the PoC service, and thereby accelerates the spread of the PoC service.

Further, the connection apparatus according to the present invention realizes grouping with a condition of various kinds, for example: grouping based on a participation request transmitted from a second communication apparatus; grouping based on a participation approval transmitted from a second first communication apparatus; and grouping based on a participation request received via a communication network such as the Internet. By virtue of this, grouping necessary for utilizing the PoC service can be achieved by using ordinary type second communication apparatuses not having a function concerning the PoC.

Further, the connection apparatus according to the present invention converts output data (specifically, loud voice) provided from a second communication apparatus or the like at an output level exceeding a threshold, into a transmission right request for requesting transmission right. By virtue of this, the PoC service becomes available for second communication apparatuses not having a dedicated function such as a transmission right request button.

Further, in the present invention, when the second communication apparatus disconnects the communication, the connection apparatus cancels the grouping. By virtue of this, grouping cancellation necessary for utilizing the PoC service can be achieved by using ordinary type second communication apparatuses not having a function concerning the PoC.

The above and further objects and features of the invention will more fully be apparent from the following detailed description with accompanying drawings.

BRIEF DESCRIPTION OF THE SEVERAL VIEWS OF THE DRAWINGS

FIG. 5 is a diagram schematically showing an example of contents recorded in a PoC member management unit of a connection apparatus according to Embodiment 1 of the present invention;

FIG. 7A and FIG. 7B are a flow chart showing an example of a procedure of grouping process performed by a first communication apparatus, a repeating apparatus, a connection apparatus, and a second communication apparatus according to Embodiment 1 of the present invention;

FIG. 10A and FIG. 10B are a flow chart showing an example of a procedure of grouping process performed by a first communication apparatus, a repeating apparatus, a connection apparatus, and a second communication apparatus according to Embodiment 2 of the present invention;

FIG. 12A and FIG. 12B are a flow chart showing an example of a procedure of grouping process performed by a repeating apparatus, a connection apparatus, and a second communication apparatus according to Embodiment 4 of the present invention.

DETAILED DESCRIPTION OF THE PRESENT INVENTION

The present invention is described below in detail with reference to the drawings showing several embodiments.

Embodiment 1

Figure 1:
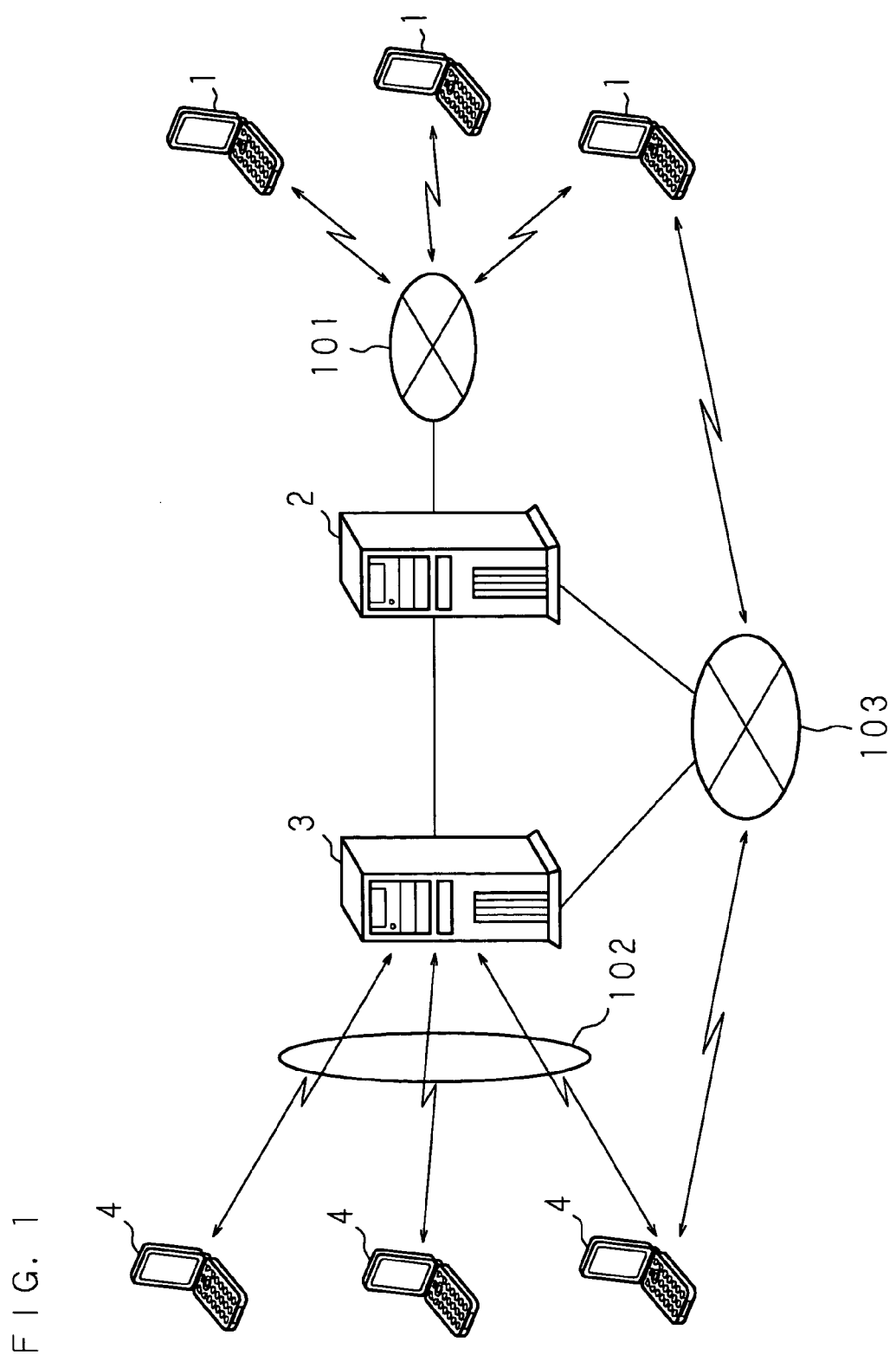
FIG. 1 is a conceptual diagram showing an example of the configuration of a communication system according to Embodiment 1 of the present invention.

FIG. 1 is a conceptual diagram showing an example of the configuration of a communication system according to Embodiment 1 of the present invention.

In FIG. 1, reference numerals 1, 1, . . . denote first communication apparatuses such as portable IP (Internet Protocol) telephone terminals having a transceiver function and used for the PoC (Push-to-Talk over Cellular) service. Each first communication apparatus is connected to a first communication network 101 such as a VoIP (Voice over Internet Protocol) network, and thereby performs packet communication with the other first communication apparatuses 1, 1, . . . by means of relay through a repeating apparatus 2 such as a PoC server computer.

Communication in the PoC service is half duplex communication performed among a plurality of grouped first communication apparatuses 1, 1, . . . under the management of the repeating apparatus 2. Specifically, one first communication apparatus 1 having acquired transmission right generates a packet containing voice data (output data) used for outputting inputted voice, and then performs multi-address calling of the generated packet to the other first communication apparatuses 1, 1, ... via the repeating apparatus 2. Then, each first communication apparatus 1 having received the packet containing voice data outputs the voice on the basis of the voice data contained in the received packet. The transmission right does not continue to be owned by the one first communication apparatus 1, and can move to another first communication apparatus 1 having requested transmission right. The packet containing voice data is in accordance with the specification of RTP (Real-time Transport Protocol) or the like which is a protocol used in VoIP communication. The voice mentioned here is not limited to sound uttered by a user, and includes sound at any audible frequency.

The repeating apparatus 2 is connected to a connection apparatus 3 according to the present invention, which is composed of a computer such as a general-purpose server computer. The connection apparatus 3 can establish call connection by setting up a communication line to each of second communication apparatuses 4, 4, ... such as portable telephone terminals, fixed-line telephone terminals, and IP telephone terminals capable of performing full duplex communication, through a second communication network 102 such as a line switching network and a packet switching network (IP network).

Each second communication apparatus 4 is a communication apparatus such as a general ordinary type portable telephone terminal which does not support the PoC service. Such a second communication apparatus 4 is connected to the connection apparatus 3 via an existing communication network of a widely spreading kind. When the second communication apparatus 4 is a portable telephone terminal, the second communication network 102 is a line switching network such as a portable telephone network that carries full duplex communication. In contrast, when the second communication apparatus 4 is a fixed-line telephone terminal, the second communication network 102 is a line switching network such as a fixed-line telephone network that carries full duplex communication. Further, when the second communication apparatus 4 is an IP telephone terminal, the second communication network 102 is a packet switching network such as an IP network that carries full duplex communication.

Further, the first communication apparatus 1, the repeating apparatus 2, the connection apparatus 3, and the second communication apparatus 4 are connected to a third communication network 103 such as the Internet which is a packet switching network, so that communication processing such as transmission and reception of an e-mail is performed. In the present description, the first communication network 101, the second communication network 102, and the third communication network 103 are different from each other. However, all or part of any two or all of these communication networks may overlap with each other. For example, as for the first communication network 101 composed of a VoIP network and the third communication network 103 composed of a packet switching network, all or part of them may overlap with each other. Alternatively, when the second communication network 102 is an IP network, the first communication network 101, the second communication network 102, and the third communication network 103 may be constructed from a single communication network.

Figure 2:
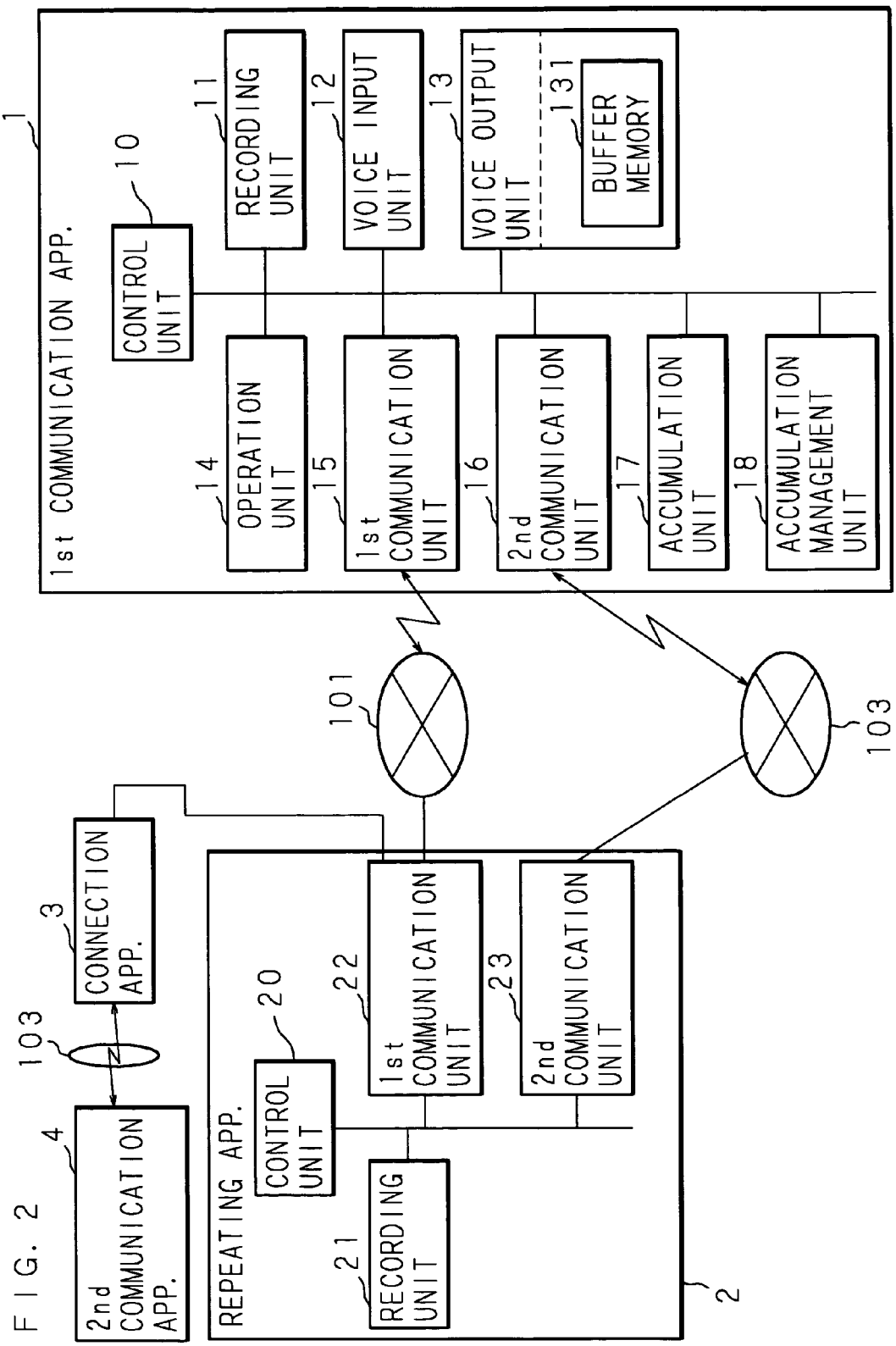
FIG. 2 is a block diagram showing an example of the configuration of each apparatus employed in a communication system according to Embodiment 1 of the present invention are provided.
Figure 3:
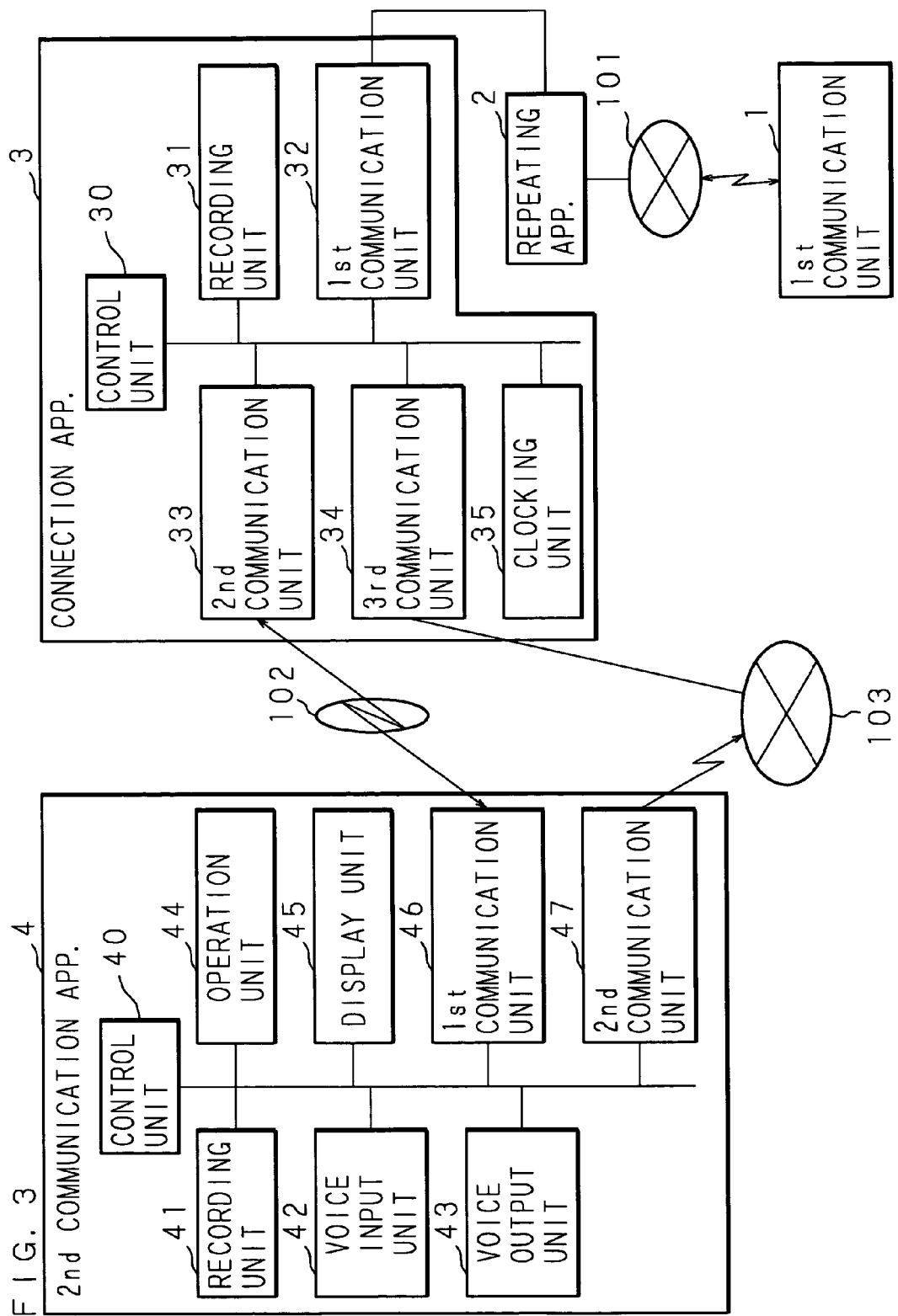
FIG. 3 is a block diagram showing an example of the configuration of each apparatus employed in a communication system according to Embodiment 1 of the present invention are provided.

FIG. 2 and FIG. 3 are block diagrams showing an example of the configuration of each apparatus employed in the communication system according to Embodiment 1 of the present invention. FIG. 2 shows an example of the configuration, mainly, of the first communication apparatus 1 and the repeating apparatus 2. FIG. 3 shows an example of the configuration, mainly, of the connection apparatus 3 and the second communication apparatus 4.

The first communication apparatus 1 is composed of hardware including: a control unit 10 for controlling the entire apparatus; a recording unit 11 composed of volatile and non-volatile memories for recording various kinds of information such as programs and data; a voice input unit 12 composed of a microphone or the like for accepting input of voice; a voice output unit 13 composed of a speaker or the like for outputting voice; an operation unit 14 provided with various push buttons and the like; a first communication unit 15 connected to the first communication network 101; a second communication unit 16 connected to the third communication network 103; an accumulation unit 17 used as a communication buffer; an accumulation management unit 18 for performing control concerning the accumulation in the accumulation unit 17, and the like. The recording unit 11 stores various kinds of programs including: a mailer program for transmitting and receiving an e-mail; a browser program used for browsing a web page in a state connected to the third communication network 103, and the like.

In the first communication apparatus 1, the following processing is performed under the control of the control unit 10. The first communication apparatus 1 converts into digital data the voice inputted and accepted as analog data from the voice input unit 12, then divides the voice data of the form of digital data into packets having a predetermined data length, and then transmits the packets through the first communication unit 15. The first communication apparatus 1 receives the packets containing the voice data from the first communication unit 15, then accumulates the voice data contained in the packets received through the accumulation unit 17, and then outputs the accumulated voice data to the voice output unit 13. The voice output unit 13 is composed of an audio chip and provided with a buffer memory 131. The voice output unit 13 accumulates the accepted voice data into the buffer memory 131, then converts the accumulated voice data into analog data, and then outputs as voice the voice data having been converted into analog data at every predetermined time interval set up as an output interval. The operation unit 14 provided in the first communication apparatus 1 comprises various kinds of push buttons such as numeric keys, symbol keys, and various function keys. As one function key, a PoC dedicated key used for requesting transmission right is provided.

The repeating apparatus 2 is composed of hardware including: a control unit 20; a recording unit 21; a first communication unit 22 connected to the first communication network 101 and the connection apparatus 3; a second communication unit 23 connected to the third communication network 103, and the like. The repeating apparatus 2 manages: a plurality of grouped apparatuses that perform telephone call on the basis of the PoC service; and an apparatus having acquired transmission right within the group. Specifically, the repeating apparatus 2 performs the processing of issuing (granting) transmission right in response to a request for transmission right transmitted from one apparatus. Then, when voice data is received from the one apparatus to which transmission right has been granted, the repeating apparatus 2 performs multi-address calling of the received voice data to the other grouped apparatuses. Further, the repeating apparatus 2 performs the processing of releasing transmission right in response to a release request for transmission right transmitted from one apparatus.

The connection apparatus 3 is composed of hardware including: a control unit 30; a recording unit 31; a first communication unit 32 connected to the repeating apparatus 2; a second communication unit 33 connected to the second communication network 102; a third communication unit 34 connected to the third communication network 103; a clocking unit 35 used as a clock and a timer, and the like.

The second communication apparatus 4 is composed of hardware including: a control unit 40; a recording unit 41; a voice input unit 42; a voice output unit 43; an operation unit 44; a display unit 45 such as a liquid crystal display monitor; a first communication unit 46 connected to the second communication network 102; a second communication unit 47 connected to the third communication network 103, and the like. FIG. 3 shows the configuration of a case where the second communication apparatus 4 is used as a portable telephone terminal for performing voice communication by IP telephone. The recording unit 41 of the second communication apparatus 4 stores various kinds of programs including: a mailer program for transmitting and receiving an e-mail; and a browser program used for browsing a web page in a state connected to the third communication network 103.

Figure 4:
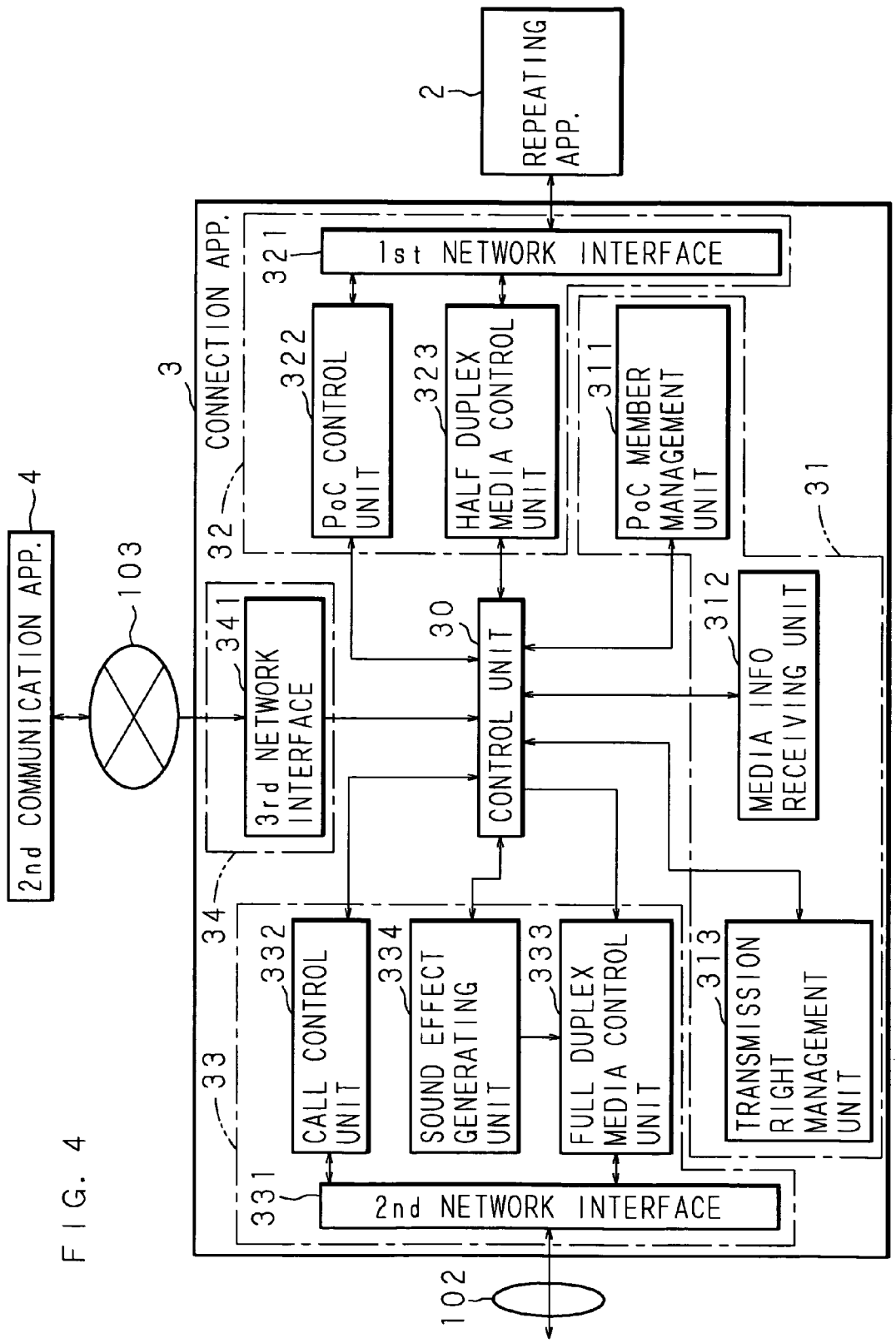
FIG. 4 is a functional block diagram showing an example of the configuration of a connection apparatus according to Embodiment 1 of the present invention.

Next, the connection apparatus 3 of the present invention is described below in further detail. FIG. 4 is a functional block diagram showing an example of the configuration of the connection apparatus 3 according to Embodiment 1 of the present invention. The connection apparatus 3 the hardware configuration of which has been described above with reference to FIG. 3 executes various programs recorded in the recording unit 31 and the like, and thereby realizes various functions of a connection apparatus 3 of the present invention in cooperation with the software.

The first communication unit 32 functions as: a first network interface 321 connected to the repeating apparatus 2 and thereby performing communication processing concerning the PoC service; a PoC control unit 322 for performing communication control concerning the PoC such as the control of half duplex communication with the repeating apparatus 2; and a half duplex media control unit 323 for performing processing concerning voice data transmitted and received by half duplex communication according to the protocol of RTP or the like.

The second communication unit 33 functions as: a second network interface 331 connected to the second communication network 102 and thereby performing communication processing; a call control unit 332 for performing call control processing for call and call-in; a full duplex media control unit 333 for performing processing concerning voice data transmitted and received by full duplex communication according to a protocol for streaming communication; and a sound effect generating unit 334 for generating sound effect used for notifying the switching situation of the function concerning the PoC service. The function of the second communication unit 33 is set up depending on the kind of permitted communication. For example, FIG. 4 illustrates the second communication unit 33 for IP telephone. However, in order that a second communication apparatus 4 for performing communication via a telephone network of circuit switching method should be supported, a second communication unit 33 having a function corresponding to the telephone network of circuit switching method need be provided separately from the second communication unit 33 for IP telephone shown in FIG. 4.

The third communication unit 34 functions as a third network interface 341 connected to the third communication network 103 and thereby performing communication processing.

The recording unit 31 functions as: a PoC member management unit 311 for managing the communication apparatuses grouped as PoC members; a media information recording unit 312 for managing information concerning the second communication apparatuses 4 grouped as PoC members and their communication control; and a transmission right management unit 313 for performing management concerning transmission right such as grant and release of transmission right.

FIG. 5 is a diagram schematically showing an example of contents recorded in the PoC member management unit 311 of the connection apparatus 3 according to Embodiment 1 of the present invention.

The PoC member management unit 311 manages the grouped communication apparatuses in accordance with each data corresponding to each item such as "PoC number", "start time", "grouping status", "apparatus information", "communication status", and the like.

The "PoC number" is data for identifying a group. The example of FIG. 5 illustrates numbers such as "1" and "2" each specifying a group.

The "start time" is data indicating the start time of grouping. The example of FIG. 5 illustrates data including: "10:00" indicating that grouping was started at 10:00 am; and "-" indicating that grouping is not yet started.

The "grouping status" is data indicating the communication status between the grouped communication apparatuses. The example of FIG. 5 illustrates data including: "started" indicating that communication has been started among the grouped communication apparatuses; and "not yet" indicating that communication is not yet started.

The "apparatus information" is data for identifying each grouped apparatus. In the example of FIG. 5, the "apparatus information" of each communication apparatus belonging to each group corresponding to each "PoC number" is illustrated by data such as "tel03xxxxxxxn" and "PoC1". Here, the "PoC1" is "apparatus information" imparted to a first communication apparatus 1 having a transceiver function. The "tel03xxxxxxxn" is "apparatus information" imparted to a second communication apparatus 4 not having a transceiver function, and is given by adding "tel" to the telephone number "03xxxxxxxn" of each second communication apparatus 4.

The "communication status" is data indicating the status of participation into the group, concerning a second communication apparatus 4 specified by the "apparatus information". As for a second communication apparatus 4 already having participated into the group, the data "on the line" is stored in correspondence to its own "apparatus information". As for a second communication apparatus 4 waiting for participation, the data "waiting" is stored in correspondence to its own "apparatus information". Here, such management based on the "communication status" is not performed on the first communication apparatuses 1. Thus, "-" is stored (neither "on the line" nor "waiting" is stored).

Figure 6:
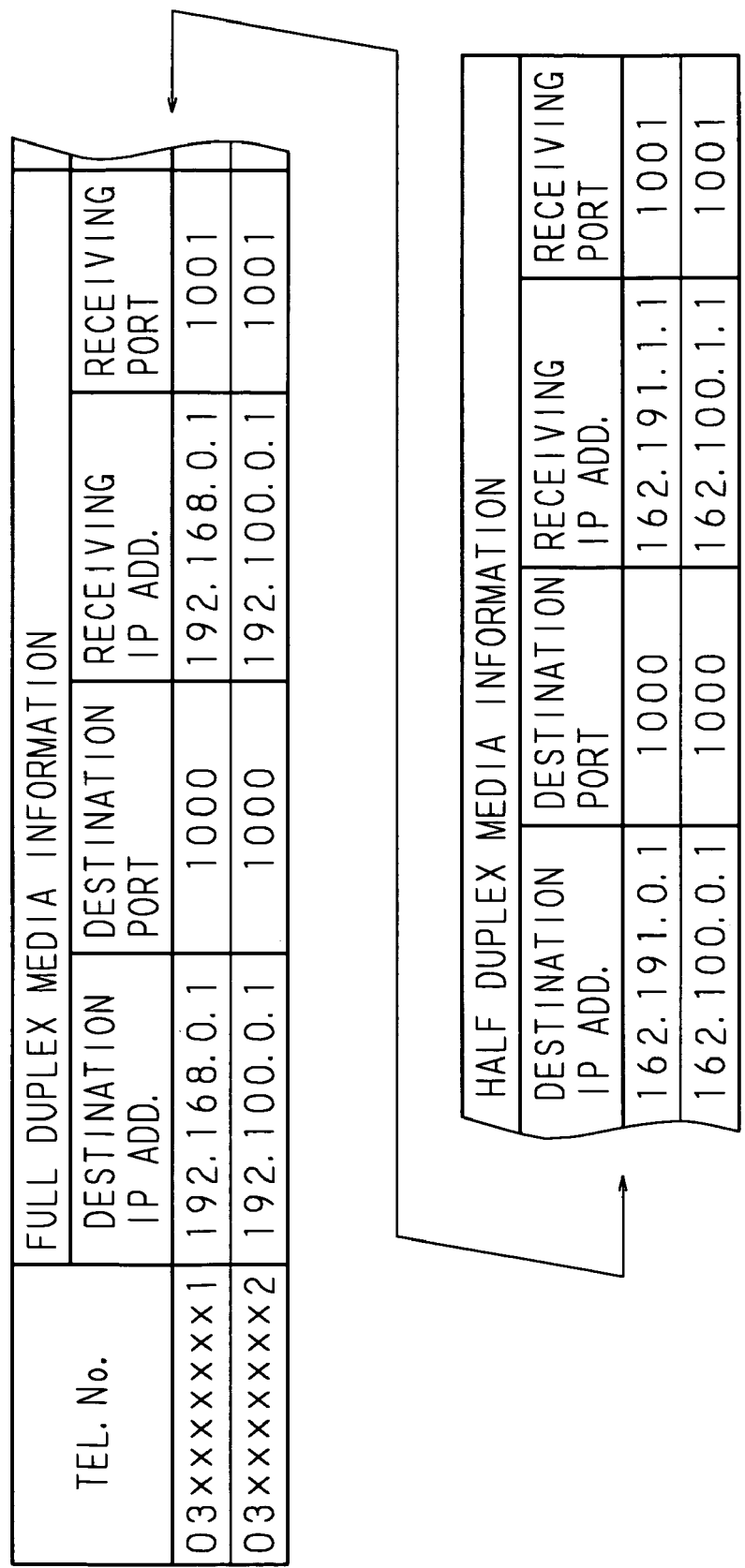
FIG. 6 is a diagram schematically showing an example of contents recorded in a media information recording unit of a connection apparatus according to Embodiment 1 of the present invention.

FIG. 6 is a diagram schematically showing an example of contents recorded in the media information recording unit 312 of the connection apparatus 3 according to Embodiment 1 of the present invention.

The media information recording unit 312 manages information concerning the grouped second communication apparatuses 4 and their communication control, in accordance with each data corresponding to each item such as "telephone number", "full duplex media information", "half duplex media information", and the like concerning each second communication apparatus 4 connected to the connection apparatus 3 in order to use the PoC service.

Each item of "telephone number" stores the telephone number of a second communication apparatus 4 in the form of data like "03xxxxxxx1". The "full duplex media information" is information used for performing communication with a grouped second communication apparatus 4 on the second communication network 102 in which communication is performed via the second communication unit 33. Specifically, when the second communication network 102 is an IP network, the "full duplex media information" includes a destination IP address, a destination port, a receiving IP address, and a receiving port. Alternatively, when the second communication network 102 is a line switching network, the "full duplex media information" is an ID for identifying a speech path. The "half duplex media information" is information used for performing communication with the repeating apparatus 2 when grouping is performed in communication performed through the first communication unit 32. Specifically, the "half duplex media information" includes a destination IP address, a destination port, a receiving IP address, and a receiving port.

Figure 7A:
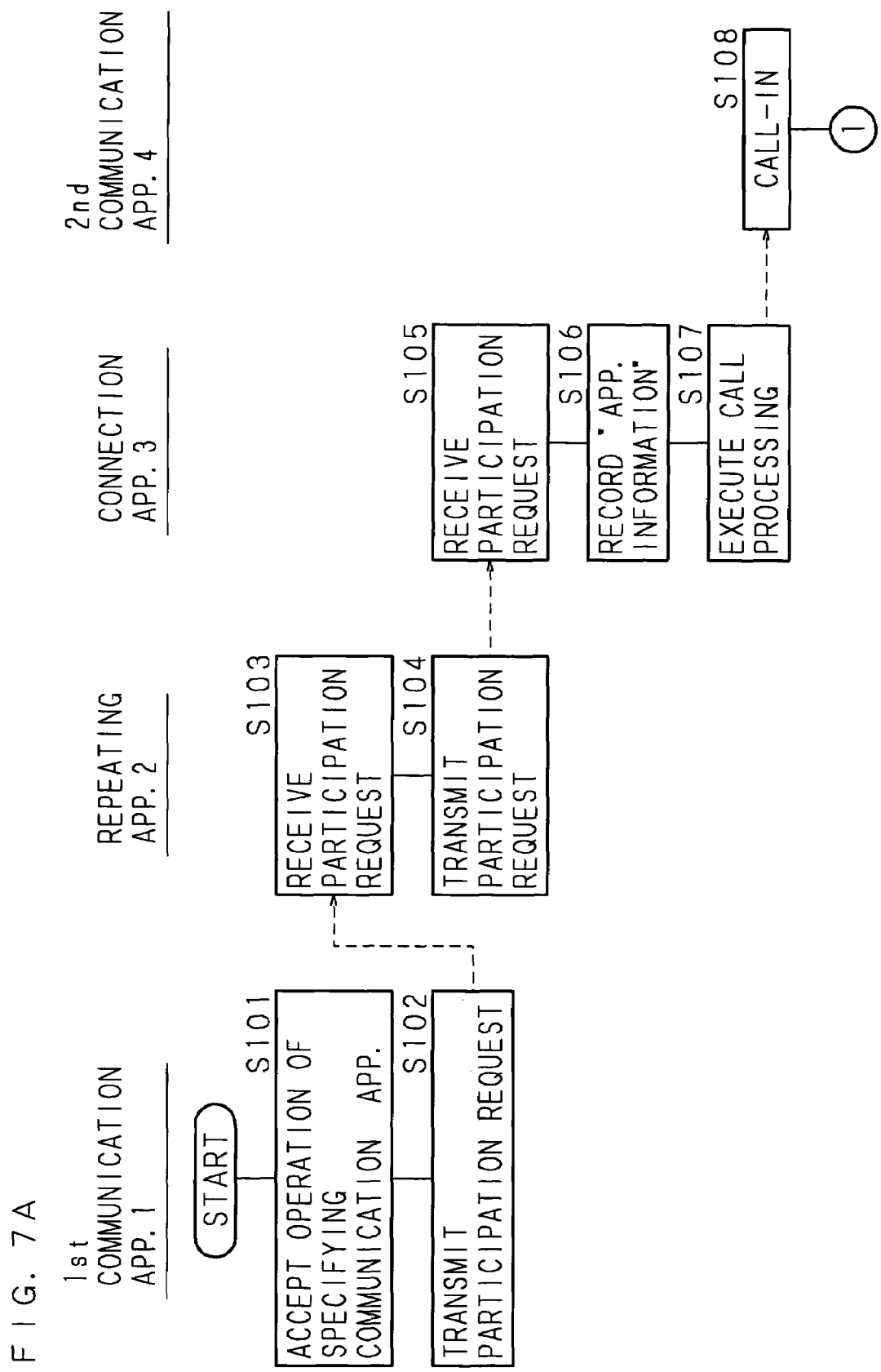

Described below is processing executed by each apparatus provided in the communication system according to Embodiment 1 of the present invention. FIG. 7A and FIG. 7B are a flow chart showing an example of a procedure of grouping process performed by the first communication apparatus 1, the repeating apparatus 2, the connection apparatus 3, and the second communication apparatus 4 according to Embodiment 1 of the present invention. Here, the first communication apparatus 1, the repeating apparatus 2, the connection apparatus 3, and the second communication apparatus 4 are controlled respectively by the control units 10, 20, 30, and 40, and thereby execute the following processing.

In order to start the use of the PoC service utilizing a transceiver function, a user who operates the first communication apparatus 1 performs an operation of specifying communication apparatuses to be set up as targets of grouping. Here, it is assumed that at least one second communication apparatus 4 is included in the specified communication apparatuses. Specifying of a second communication apparatus 4 is performed by inputting of the telephone number of second communication apparatus 4 or alternatively by selecting from a list of telephone numbers inputted in advance.

The first communication apparatus 1 accepts an operation of specifying one or a plurality of communication apparatuses including at least one second communication apparatus 4 (S101). Then, the first communication apparatus 1 transmits a participation request as a command for requesting participation into a group with specifying the accepted (specified) communication apparatuses, from the first communication unit 15 to the repeating apparatus 2 via the first communication network 101 (S102). The participation request transmitted from the first communication apparatus 1 includes the "apparatus information" as described bellow for identifying the communication apparatuses as follows. Each second communication apparatus 4 is identified by the "apparatus information" generated on the basis of its telephone number.

"tel03xxxxxxx1"
"tel03xxxxxxx2"
"PoC1"

The repeating apparatus 2 receives the participation request transmitted from the first communication apparatus 1, through the first communication unit 22 via the first communication network 101 (S103), and then transmits the participation request to the connection apparatus 3 acting as the proxy of the specified second communication apparatus 4 (S104). At step S104, when the first communication apparatus 1 other than the first communication apparatus 1 as the transmission source of the participation request is also specified, the participation request is transmitted also to all of the other specified first communication apparatuses 1. The repeating apparatus 2 judges whether any second communication apparatus 4 is specified or not, on the basis of detection whether the participation request includes the "apparatus information" generated on the basis of the telephone number of each second communication apparatus 4.

The connection apparatus 3 receives the participation request by using the functions of the first network interface 321 and the PoC control unit 322 of the first communication unit 32 (S105), and then records the "apparatus information" included in the received participation request into the PoC member management unit 311 of the recording unit 31 (S106). At the stage of recording into the PoC member management unit 311 at step S106, approval for the participation from each second communication apparatus 4 is not received. Thus, the "communication status" becomes "waiting".

Then, the connection apparatus 3 executes call processing for each second communication apparatus 4 by performing call on the basis of the "apparatus information" (the telephone number, in this example) of each second communication apparatus 4 by using the functions of the call control unit 332 and the second network interface 331 of the second communication unit 33 (S107). Here, when an error occurs, for example, when failure occurs in the recording processing of the "apparatus information" at step S106 or alternatively when failure occurs in the call processing at step S107, the connection apparatus 3 returns the procedure to step S106, and then repeats processing similar to the above-mentioned one. When all the lines to be used for the call from the connection apparatus 3 to each second communication apparatus 4 are busy, the connection apparatus 3 waits for a predetermined time in a line release waiting state.

Each second communication apparatus 4 receives call-in based on the call processing from the connection apparatus 3 (S108), and then performs incoming processing such as outputting of incoming indicator tone. Then, the user of each second communication apparatus 4 who has confirmed the call-in performs an operation of replying the call-in. Each second communication apparatus 4 having accepted the operation transmits to the connection apparatus 3 a response signal indicating the response to the call processing (S109).

The connection apparatus 3 receives the response signal by using the functions of the call control unit 332 and the second network interface 331 of the second communication unit 33 (S110), and then establishes call connection to each second communication apparatus 4 on the basis of the received response signal (S111). Then, the connection apparatus 3 records into the PoC member management unit 311 the "apparatus information" for identifying each second communication apparatus 4 to which call connection has been established, as the information of an apparatus participating into the group (S112). Then, the connection apparatus 3 records into the media information recording unit 312 the "full duplex media information" and the "half duplex media information" together with the telephone number of each second communication apparatus 4 (S113). After that, the connection apparatus 3 transmits to the repeating apparatus 2 a participation approval as a reply indicating approval of participation of each second communication apparatus 4 into the group, by using the functions of the first network interface 321 and the PoC control unit 322 of the first communication unit 32 (S114). When the connection apparatus 3 receives the response signal at step S110, call connection is established at step S111 so that a speech path is set up between the connection apparatus 3 and each second communication apparatus 4. Here, in a case where each second communication apparatus 4 is an IP telephone terminal connected via a packet switching network, when call connection is established, a virtual communication line is set up. Recording of the "apparatus information" at step S112 indicates that the "communication status" of each corresponding second communication apparatus 4 is set to be "on the line". At that time, the "grouping status" is set to be "started".

The repeating apparatus 2 receives the participation approval by the first communication unit 22 (S115), and then executes grouping on the basis of the received participation approval (S116). Then, at each time that a new communication apparatus is grouped in, the repeating apparatus 2 transmits a grouping notice that indicates the execution of grouping, to the communication apparatuses having approved the participation. The grouping notice to each second communication apparatus 4 is transmitted to the connection apparatus 3. Then, a signal for generating predetermined sound effect is transmitted from the connection apparatus 3 to each second communication apparatus 4. Voice guidance may be generated as the sound effect.

When grouping is executed by the processing described above, call is performed from the connection apparatus 3 to each second communication apparatus 4. Then, when call connection is established between the connection apparatus 3 and each second communication apparatus 4, a speech path is set up. Thus, telephone charge from the telephone company is assigned to the administrator of the connection apparatus 3. However, the administrator of the connection apparatus 3 may collect the assigned telephone charge as a service charge from the user of each second communication apparatus 4. Alternatively, the call may be performed as a collect call from the connection apparatus 3 to each second communication apparatus 4, so that the telephone charge may be assigned to the user of each second communication apparatus 4 by the telephone company. As such, grouping process is executed.

Figure 8A:
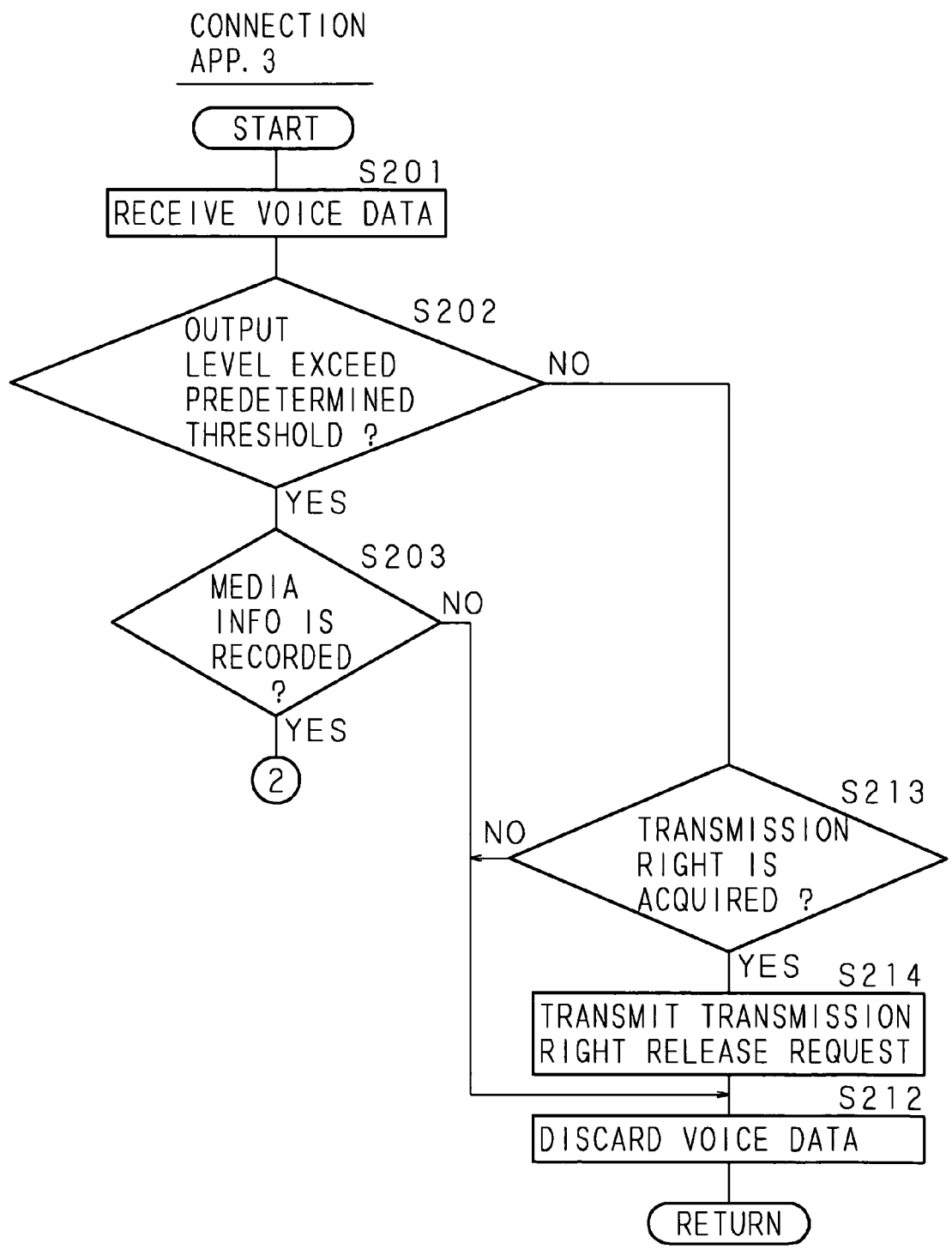
FIG. 8A and FIG. 8B are a flow chart showing a procedure of receiving voice data from a second communication apparatus performed by a connection apparatus according to Embodiment 1 of the present invention.
Figure 8B:
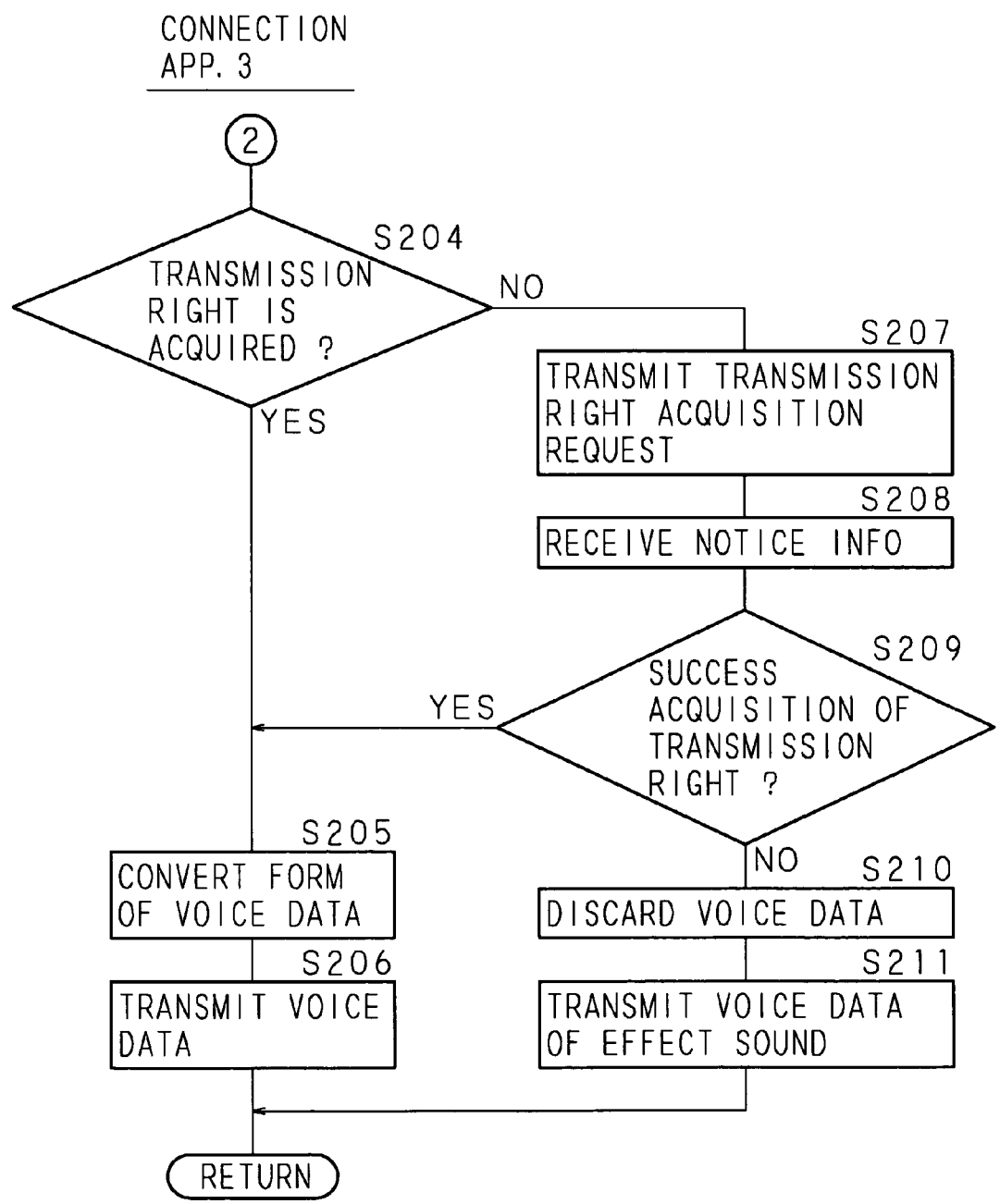

FIG. 8A and FIG. 8B are a flow chart showing a procedure of receiving voice data from the second communication apparatus 4 performed by the connection apparatus 3 according to Embodiment 1 of the present invention. Here, the connection apparatus 3 is controlled by the control unit 30, and thereby executes the following processing.

When call connection is established between the connection apparatus 3 and the second communication apparatus 4 so that a speech path for full duplex communication is set up, voice is always transmitted as voice data from the second communication apparatus 4 to the connection apparatus 3. The connection apparatus 3 receives the voice data by using the functions of the second network interface 331 and the full duplex media control unit 333 of the second communication unit 33 (S201), and then judges whether the output level of the voice to be outputted on the basis of the received voice data exceeds a predetermined threshold having been set up in advance (S202). The judgment at step S202 is performed for the following purpose. That is, when the output level of the voice exceeds the threshold, the voice is assumed as containing a speech or the like of the user of the second communication apparatus 4, so that the data is determined as appropriate voice data to be transmitted to the other communication apparatuses by multi-address calling. In contrast, when the output level is below the threshold, it is determined as silence or noise-level voice, so that the data is assumed as not necessary to be transmitted to the other communication apparatuses.

At step S202, when it is judged that the output level exceeds the threshold (S202: YES), the connection apparatus 3 compares the information of the full duplex media indicating the transmission source of the received voice data with the contents recorded in the media information recording unit 312, and thereby judges whether corresponding "half duplex media information" is recorded in the media information recording unit 312 (S203).

At step S203, when it is judged that corresponding "half duplex media information" is recorded (S203: YES), the connection apparatus 3 judges whether the second communication apparatus 4 as the transmission source of the voice data has acquired transmission right (S204). The judgment at step S204 whether transmission right has been acquired is performed by inquiry to the repeating apparatus 2. Here, the PoC member management unit 311 may manage the communication apparatus acquiring transmission right, while the data recorded in the PoC member management unit 311 may be referred to so that the judgment whether transmission right has been acquired may be performed.

At step S204, when it is judged that transmission right has been acquired (S204: YES), the connection apparatus 3 converts the format of the received voice data (S205), and then transmits the converted voice data to the repeating apparatus 2 by using the functions of the half duplex media control unit 323 and the first network interface 321 of the first communication unit 32 (S206). Conversion of the format of the voice data at step S205 is conversion into a format based on the protocol of RTP or the like corresponding to the repeating apparatus 2. Thus, this processing is not indispensable when the format of the voice data received from the second communication apparatus 4 is the same as that used in the communication with the repeating apparatus 2. Then, the repeating apparatus 2 performs multi-address calling of the received voice data to the other communication apparatuses having been grouped with the second communication apparatus 4 as the transmission source. Transmission of the voice data is executed by this procedure.

At step S204, when it is judged that transmission right is not acquired (S204: NO), the connection apparatus 3 transmits to the repeating apparatus 2 a transmission right acquisition request as a command for requesting the acquisition of transmission right, by using the functions of the PoC control unit 322 and the first network interface 321 of the first communication unit 32 (S207).

The repeating apparatus 2 having received the transmission right acquisition request judges the permission or non-permission of granting transmission right to each second communication apparatus 4. Transmission right is granted to each second communication apparatus 4 for which granting of transmission right has been judged as permitted. Then, notice information indicating that transmission right has been granted is transmitted to the connection apparatus 3 as a response to the transmission right acquisition request. When it is judged that granting of transmission right is not permitted, notice information indicating that transmission right is not granted is transmitted to the connection apparatus 3 as a response to the transmission right acquisition request. The judgment of the permission or non-permission of granting of transmission right, the granting of transmission right, the transmission of notice information performed in response to a transmission right acquisition request, and the like as described here are basic functions of the repeating apparatus 2 that provides the PoC service, and can be realized by using various kinds of well known art having been used already.

The connection apparatus 3 receives from the repeating apparatus 2 the notice information as the response to the transmission right acquisition request, by using the functions of the first network interface 321 and the PoC control unit 322 of the first communication unit 32 (S208), and then judges the success or unsuccess of acquisition of transmission right on the basis of the received notice information (S209).

At step S209, when it is judged that acquisition of transmission right has been successful (S209: YES), the connection apparatus 3 advances the procedure to step S205, then converts the format of the received voice data when necessary, and then transmits the data to the repeating apparatus 2.

At step S209, when it is judged that acquisition of transmission right has been unsuccessful (S209: NO), the connection apparatus 3 discards the received voice data (S210), and then transmits, to the second communication apparatus 4, voice data used for outputting sound effect indicating that the voice data cannot be transmitted, by using the functions of the sound effect generating unit 334, the full duplex media control unit 333, and the second network interface 331 of the second communication unit 33 (S211). Then, the connection apparatus 3 terminates the processing. As for this sound effect, voice guidance such as "you have no transmission right" or the like may be outputted.

At step S203, when it is judged that corresponding "half duplex media information" is not recorded (S203: NO), the connection apparatus 3 discards the received voice data (S212), and then terminates the processing.

At step S202, when it is judged that the output level is below the threshold (S202: NO), the connection apparatus 3 judges whether the second communication apparatus 4 as the transmission source of the voice data has acquired transmission right (S213).

At step S213, when it is judged that transmission right has been acquired (S213: YES), the connection apparatus 3 transmits to the repeating apparatus 2 a transmission right release request as a command for requesting the release of transmission right, by using the functions of the PoC control unit 322 and the first network interface 321 of the first communication unit 32 (S214). After that, the connection apparatus 3 advances the procedure to step S212, and then discards the received voice data. Here, when it is judged that the output level is below the threshold, the transmission right release request need not immediately be transmitted. That is, the transmission right release request may be transmitted when a predetermined time has elapsed in a state where the voice level remains below the threshold.

The repeating apparatus 2 having received the transmission right acquisition request releases the transmission right granted to the second communication apparatus 4. The processing of releasing the transmission right and the like performed in response to the transmission right release request are basic functions of the repeating apparatus 2 that provides the PoC service, and can be realized by using various kinds of well known art having been used already.

At step S213, when it is judged that transmission right is not acquired (S213: NO), the connection apparatus 3 advances the procedure to step S212, and then discards the received voice data. As such, processing concerning the receiving of voice data from the second communication apparatus 4 is executed.

Figure 9:
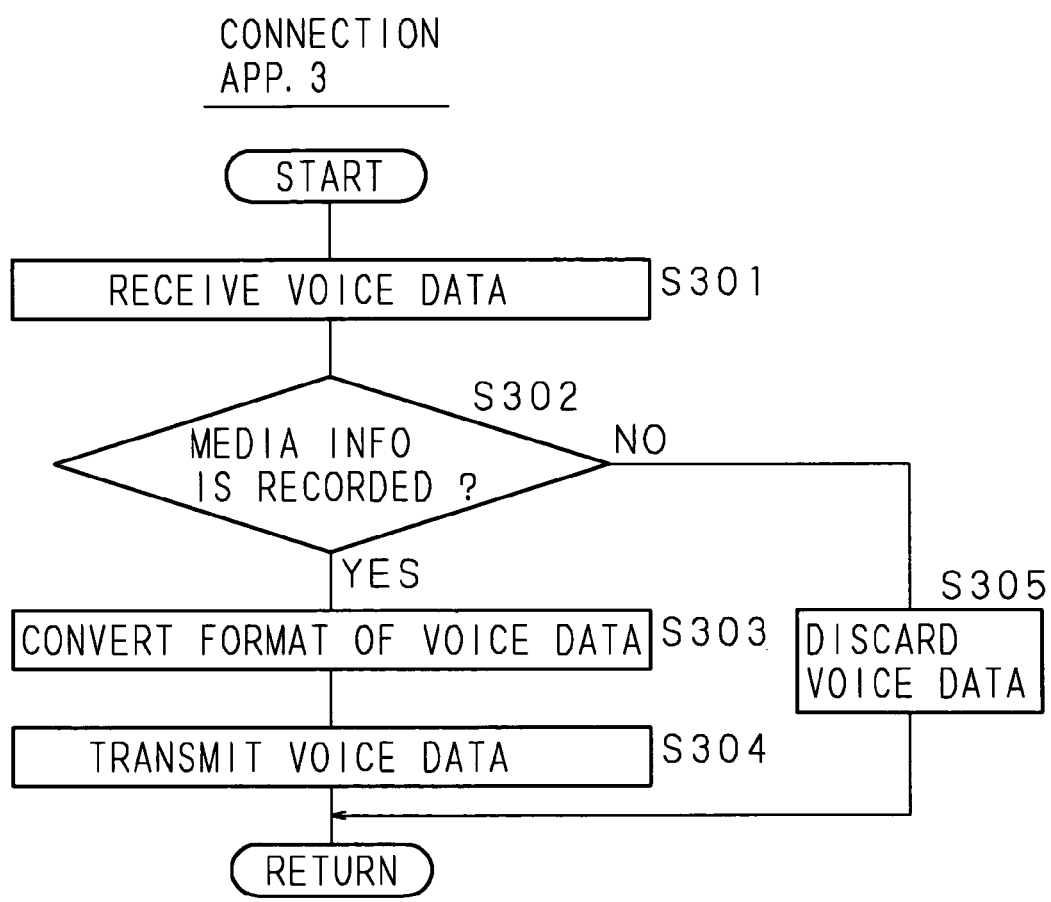
FIG. 9 is a flow chart showing a procedure of receiving voice data from a repeating apparatus performed by a connection apparatus according to Embodiment 1 of the present invention.

FIG. 9 is a flow chart showing a procedure of receiving voice data from the repeating apparatus 2 performed by the connection apparatus 3 according to Embodiment 1 of the present invention. Here, the connection apparatus 3 is controlled by the control unit 30, and thereby executes the following processing.

After grouping is performed, when a first communication apparatus 1 connected to the repeating apparatus 2 among a plurality of the grouped communication apparatuses has acquired transmission right for transmitting voice data, the second communication apparatus 1 having acquired transmission right transmits voice data to the repeating apparatus 2. Then, the repeating apparatus 2 performs multi-address calling of the received voice data to each grouped communication apparatus. When a second communication apparatus 4 is included in the grouped communication apparatuses, the repeating apparatus 2 transmits the voice data to the connection apparatus 3 as the proxy of the second communication apparatus 4. Here, the voice data transmitted to the connection apparatus 3 is transmitted in the form of packets generated according to the protocol of RTP or the like.

The connection apparatus 3 receives the voice data by using the functions of the first network interface 321 and the half duplex media control unit 323 of the first communication unit 32 (S301), then compares the "apparatus information" included in the received voice data with the contents recorded in the media information recording unit 312, and thereby judges whether corresponding "full duplex media information" is recorded in the media information recording unit 312 (S302).

At step S302, when it is judged that corresponding "full duplex media information" is recorded (S302: YES), the connection apparatus 3 converts the format of the received voice data (S303), and then transmits the converted voice data to the second communication apparatus 4 via the second communication network 102 by using the functions of the full duplex media control unit 333 and the second network interface 331 of the second communication unit 33 (S304). The conversion of the format of the voice data at step S303 is conversion of the format according to the protocol corresponding to the speech path that is set up on the second communication network 102. Thus, this processing is not indispensable when the format of the voice data received from the repeating apparatus 2 is the same as that used in the communication with the second communication apparatus 4.

The second communication apparatus 4 receives the voice data through the first communication unit 46, and then outputs from the voice output unit 43 the voice generated on the basis of the received voice data.

At step S302, when it is judged that corresponding "full duplex media information" is not recorded (S302: NO), the connection apparatus 3 discards the received voice data (S305). Here, the voice data received by the connection apparatus 3 from the repeating apparatus 2 is transmitting data having been transmitted from the communication apparatus which acquires the transmission right. Thus, the processing of judging which apparatus has transmission right is not performed. As such, processing concerning the receiving of voice data from the repeating apparatus 2 is executed.

Embodiment 2

Embodiment 2 of the present invention shows a mode that in Embodiment 1, a participation request is transmitted from a first communication apparatus, and that call identification information such as the telephone number necessary for the call to a connection apparatus is transmitted to a second communication apparatus. In the following description, same components to Embodiment 1 are designated by same reference numerals to Embodiment 1. The example of the configuration of a communication system and each apparatus employed in the communication system according to Embodiment 2 of the present invention is similar to that of Embodiment 1. Thus, Embodiment 1 should be referred to for their description. Hence, the description is omitted in the present embodiment.

Figure 10B:
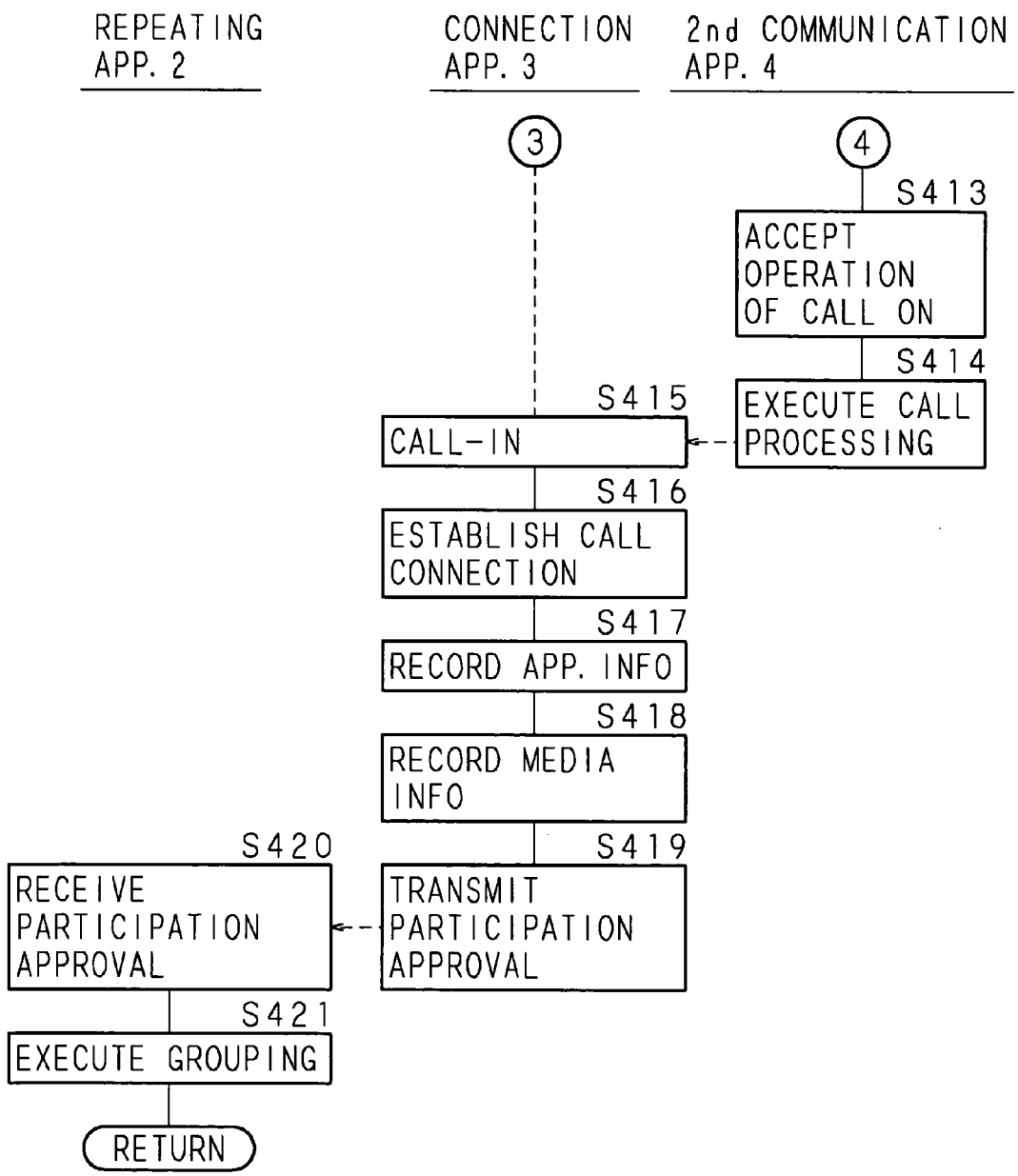

Described below is processing executed by each apparatus provided in the communication system according to Embodiment 2 of the present invention. FIG. 10A and FIG. 10B are a flow chart showing an example of a procedure of grouping process performed by the first communication apparatus 1, the repeating apparatus 2, the connection apparatus 3, and the second communication apparatus 4 according to Embodiment 2 of the present invention. Here, the first communication apparatus 1, the repeating apparatus 2, the connection apparatus 3, and the second communication apparatus 4 are controlled respectively by the control units 10, 20, 30, and 40, and thereby execute the following processing.

In order to start the use of the PoC service utilizing a transceiver function, a user who operates the first communication apparatus 1 performs an operation of specifying communication apparatuses to be set up as targets of grouping.

The first communication apparatus 1 accepts through the operation unit 14 the operation of specifying one or a plurality of communication apparatuses including at least one second communication apparatus 4 (S401). Then, the first communication apparatus 1 transmits a participation request as a command for requesting participation into a group with specifying the accepted (specified) communication apparatuses, from the first communication unit 15 to the repeating apparatus 2 via the first communication network 101 (S402).

Further, after starting a mailer program, the user who operates the first communication apparatus 1 inputs call identification information such as the telephone number necessary for the call of the connection apparatus 3, in the body of letter or the subject. Then, the user inputs the e-mail address of the second communication apparatus 4 as a destination e-mail address, and then performs an operation of transmitting the e-mail. The first communication apparatus 1 accepts the operation of transmitting the call identification information (S403). Then, the mailer program transmits the call identification information of the connection apparatus 3 in the form of an e-mail from the second communication unit 16 to the second communication apparatus 4 via the third communication network 103 (S404). Here, steps S403 and S404 have been described for the case where an e-mail indicating the call identification information is transmitted on the basis of an operation by the user. However, the first communication apparatus 1 may automatically judge whether a second communication apparatus 4 is included in the specified communication apparatuses. Then, when such an apparatus is included, call identification information recorded in the recording unit 41 in advance may be transmitted in the form of an e-mail. Nevertheless, in this case, the user need input in advance the e-mail address of the second communication apparatus 4 at the time of specifying the communication apparatuses or alternatively by anterior registration processing. Further, the present description has been given for the case where the call identification information is recorded in the recording unit 41. However, the call identification information may be acquired from the repeating apparatus 2 as a response to the participation request. In this configuration, when a plurality of connection apparatuses 3 are present in the system, the repeating apparatus 2 can selects an available connection apparatus 3.

The repeating apparatus 2 receives through the first communication unit 22 the participation request transmitted from the first communication apparatus 1 via the first communication network 101 (S405), and then transmits the participation request to the connection apparatus 3 acting as the proxy of the specified second communication apparatus 4 (S406). At step S406, when communication apparatus other than the second communication apparatus 4 is also specified, the participation request is transmitted also to all of the other specified communication apparatuses.

The connection apparatus 3 receives the participation request, by using the functions of the first network interface 321 and the PoC control unit 322 of the first communication unit 32 (S407), then records the "apparatus information" included in the received participation request into the PoC member management unit 311 of the recording unit 31 (S408), and then records the "half duplex media information" together with the telephone number into the media information recording unit 312 (S409). After that, the connection apparatus 3 waits for call-in from the second communication apparatus 4 (S410).

The second communication apparatus 4 receives through the second communication unit 47 the call identification information transmitted in the form of an e-mail via the third communication network 103 (S411), and then displays the received call identification information on the display unit 45 (S412). Then, the user of the second communication apparatus 4 who confirmed the call identification information performs an operation of performing call on the basis of the displayed call identification information, that is, the telephone number, of the connection apparatus 3.

The second communication apparatus 4 accepts through the operation unit 44 the operation of performing call on the basis of the call identification information (S413), and then performs call on the basis of the call identification information so as to execute call processing for the connection apparatus 3 (S414).

The connection apparatus 3 waiting for call-in receives the call-in based on the call processing of the second communication apparatus 4 (S415), and then establishes call connection to the second communication apparatus 4 (S416). Then, the connection apparatus 3 records into the PoC member management unit 311 the "apparatus information" for identifying the second communication apparatus 4 to which call connection has been established, as the information of an apparatus participating into the group (S417). Then, the connection apparatus 3 searches the media information recording unit 312 by adopting the telephone number of the received call-in as a search key, and then records the "full duplex media information" into the corresponding "full duplex media information" item (S418). After that, the connection apparatus 3 transmits to the repeating apparatus 2 a participation approval as a reply indicating approval of participation of the second communication apparatus 4 into the group, by using the functions of the first network interface 321 and the PoC control unit 322 of the first communication unit 32 (S419). At step S415, when the connection apparatus 3 receives and replies the call-in automatically, call connection is established at step S416 so that a speech path is set up between the connection apparatus 3 and the second communication apparatus 4. Here, when the elapsed time of waiting for call-in reaches a predetermined time, the connection apparatus 3 assumes that the second communication apparatus 4 did not approve participation into the group. In this case, the connection apparatus 3 deletes from the PoC member management unit 311 the "apparatus information" for identifying the second communication apparatus 4, and deletes the "half duplex media information" from the media information recording unit 312. When an error occurs, for example, when failure occurs in the recording processing of the "apparatus information" at step S408 or alternatively when failure occurs in the recording processing of the "half duplex media information" at step S409, the connection apparatus 3 returns the procedure to step S408, and then repeats processing similar to the above-mentioned one.

The repeating apparatus 2 receives the participation approval through the first communication unit 22 (S420), and then executes grouping on the basis of the received participation approval (S421).

When grouping is executed by the processing described above, call is performed from the second communication apparatus 4 to the connection apparatus 3. Then, when call connection is established between the connection apparatus 3 and the second communication apparatus 4, a speech path is set up. Accordingly, telephone charge from the telephone company is assigned to the administrator of the second communication apparatus 4. As such, grouping process is executed.

The processing concerning the receiving of voice data in the connection apparatus 3 according to Embodiment 2 is similar to that of Embodiment 1. Thus, Embodiment 1 should be referred to for its description. Hence, the description is omitted in the present embodiment.

Embodiment 3

Embodiment 3 shows a mode that in Embodiment 1, a participation request is transmitted from an arbitrary apparatus to a connection apparatus via a third communication network such as the Internet to which unspecified web server computers are connected.

In the following description, same components to Embodiment 1 are designated by same reference numerals to Embodiment 1. The example of the configuration of a communication system and each apparatus employed in the communication system according to Embodiment 3 of the present invention is similar to that of Embodiment 1. Thus, Embodiment 1 should be referred to for their description. Hence, the description is omitted in the present embodiment.

Figure 11A:
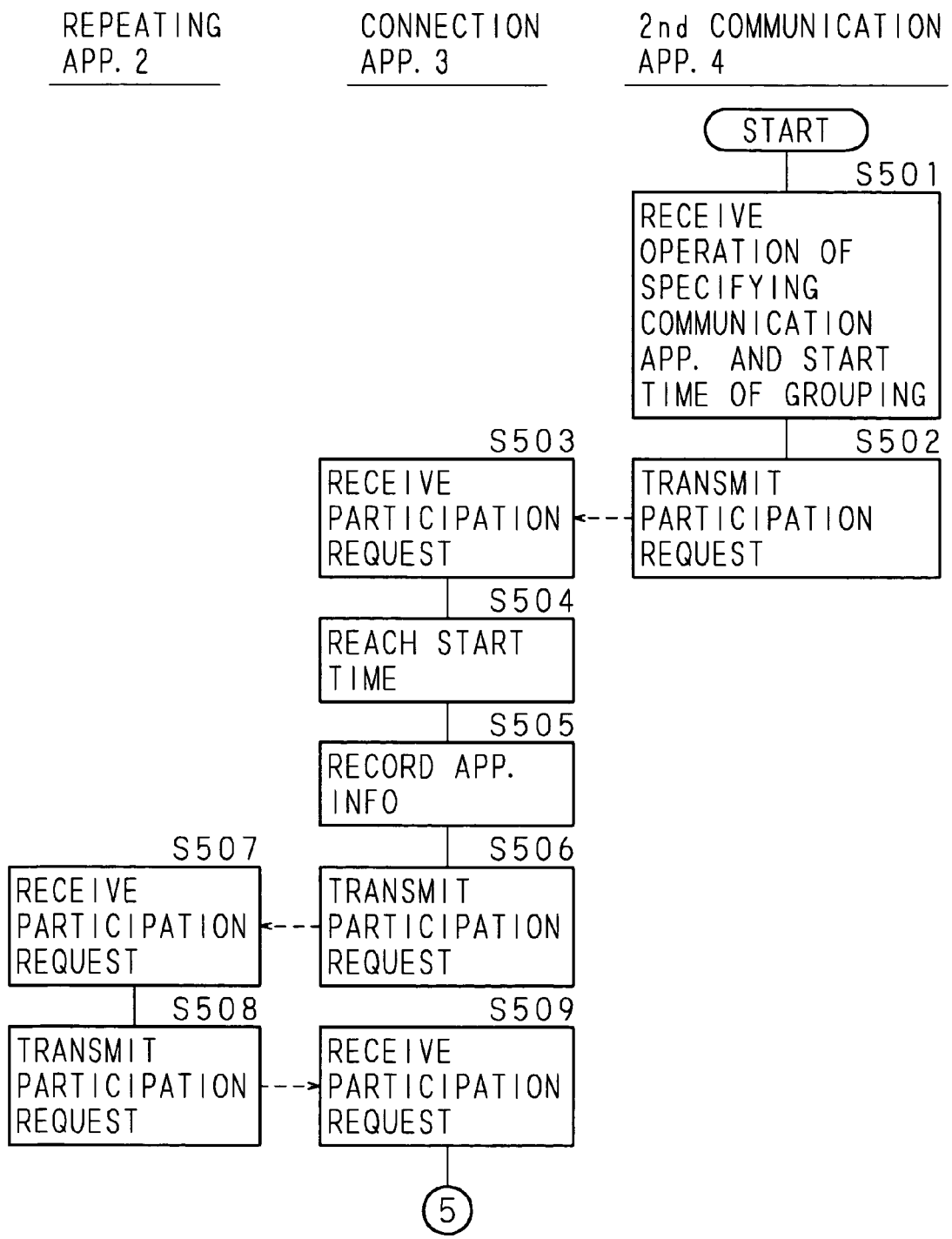
FIG. 11A and FIG. 11B are a flow chart showing an example of a procedure of grouping process performed by a repeating apparatus, a connection apparatus, and a second communication apparatus according to Embodiment 3 of the present invention.
Figure 11B:
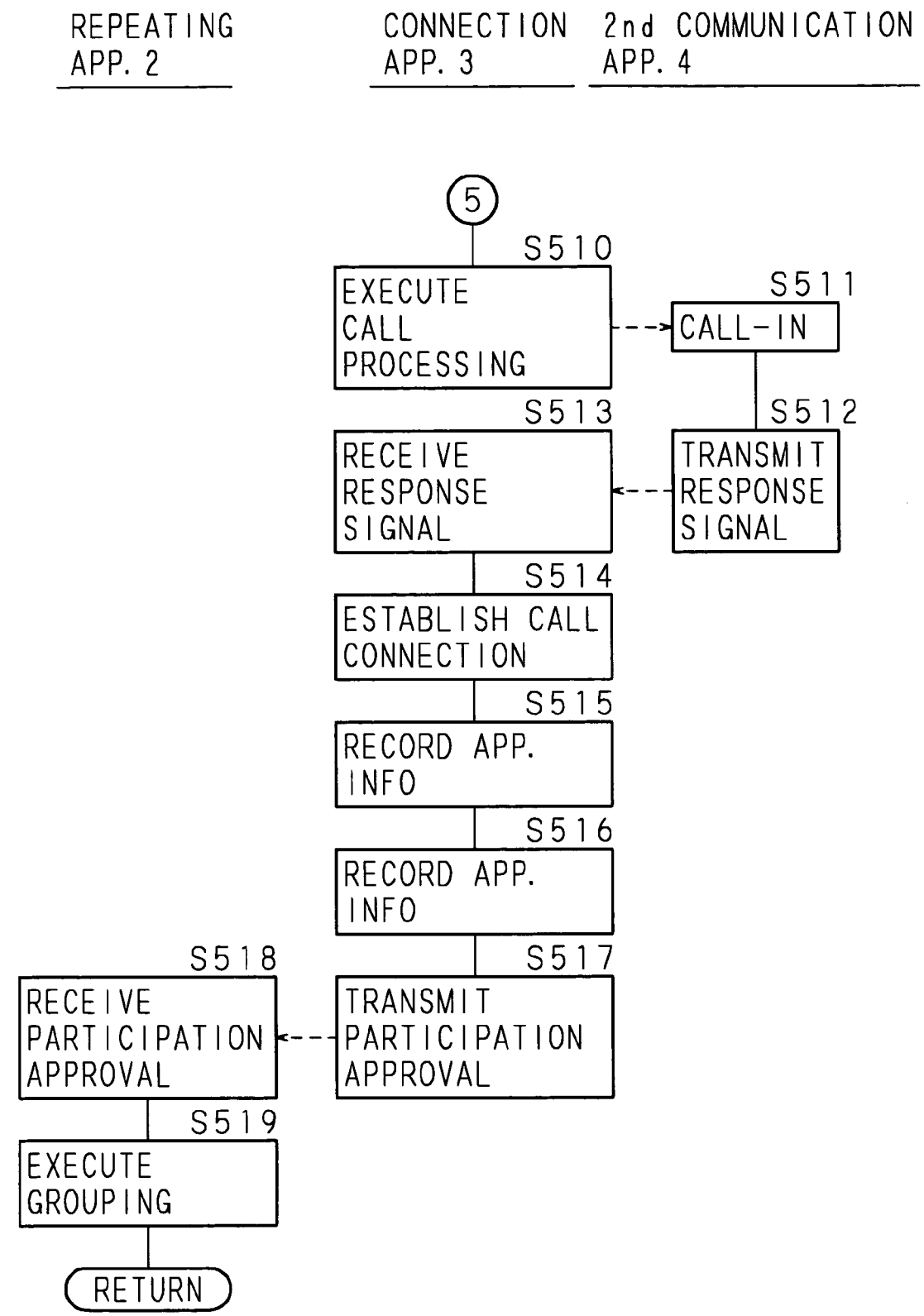

Described below is processing executed by each apparatus provided in the communication system according to Embodiment 3 of the present invention. FIG. 11A and FIG. 11B are a flow chart showing an example of a procedure of grouping process performed by the repeating apparatus 2, the connection apparatus 3, and the second communication apparatus 4 according to Embodiment 3 of the present invention. Here, the repeating apparatus 2, the connection apparatus 3, and the second communication apparatus 4 are controlled respectively by the control units 20, 30, and 40, and thereby execute the following processing.

After starting a browser program, a user who operates the second communication apparatus 4 accesses a predetermined web page which transmits a participation request to the connection apparatus 3, and thereby performs input of specifying a plurality of communication apparatuses. For example, when specifying a second communication apparatus 4, the user inputs the telephone number of the second communication apparatus 4. Here, the web page may be customized for the user in advance. That is, information concerning the communication apparatuses to be selected may be recorded, so that communication apparatuses to be grouped may be selected from the recorded information.

The second communication apparatus 4 accepts through the operation unit 44 the operation of specifying a plurality of communication apparatuses including at least one second communication apparatus 9 and the start time of grouping (S501). Then, the second communication apparatus 4 transmits a participation request as a command for requesting participation into the group with specifying the accepted (specified) communication apparatuses and start time, from the second communication unit 47 to the connection apparatus 3 via the third communication network 103 such as the Internet to which unspecified web server computers are connected (S502). The participation request transmitted at step S502 is transferred to the connection apparatus 3 via various kinds of computers including web server computers that provide web pages. Here, the connection apparatus 3 may be used as a web server computer for providing the web page used by the user for inputting the participation request. Further, the participation request transmitted from the second communication apparatus 4 is transferred to the connection apparatus 3 not via the repeating apparatus 2. Further, as long as an employed apparatus has the function of accessing a web page, the second communication apparatus 4 need not be used. That is, the participation request may be transmitted from an arbitrary apparatus. For example, a participation request can be transmitted using the first communication apparatus 1 or alternatively a communication apparatus not included in the group.

The connection apparatus 3 receives through the third communication unit 34 the participation request transmitted from the second communication apparatus 4 via the third communication network 103 (S503). Then, after the time clocked by the clocking unit 35 reaches the start time specified by the participation request (S504), the connection apparatus 3 records the "apparatus information" for identifying the communication apparatuses specified by the participation request, into the PoC member management unit 311 of the recording unit 31 (S505).

Then, the connection apparatus 3 transmits the participation request to the repeating apparatus 2 by using the functions of the PoC control unit 322 and the first network interface 321 of the first communication unit 32 (S506).

The repeating apparatus 2 receives the participation request by the second communication unit 23 (S507), then confirms that the received participation request includes the second communication apparatus 4, and then transmits the participation request to the connection apparatus 3 acting as the proxy of the specified second communication apparatus 4 (S508). At step S508, when communication apparatus other than the second communication apparatus 4 is also specified, the participation request is transmitted also to all of the other specified communication apparatuses.

The connection apparatus 3 receives the participation request by using the functions of the first network interface 321 and the PoC control unit 322 of the first communication unit 32 (S509), and then performs call on the basis of the "apparatus information" (the telephone number, in this example) for identifying the second communication apparatus 4 specified by the received participation request, so as to execute call processing for the second communication apparatus 4 (S510).

The second communication apparatus 4 receives call-in based on the call processing from the connection apparatus 3 (S511), and then performs incoming processing such as outputting of incoming indicator tone. Then, the user of the second communication apparatus 4 who has confirmed the call-in performs an operation of replying the call-in. The second communication apparatus 4 having accepted the operation transmits to the connection apparatus 3 a response signal indicating the response to the call processing (S512).

The connection apparatus 3 receives the response signal by using the functions of the call control unit 332 and the second network interface 331 of the second communication unit 33 (S513), and then establishes call connection to the second communication apparatus 4 on the basis of the received response signal (S514). Then, the connection apparatus 3 records into the PoC member management unit 311 the "apparatus information" for identifying the second communication apparatus 4 to which call connection has been established, as the information of an apparatus participating into the group (S515). Then, the connection apparatus 3 records into the media information recording unit 312 the "full duplex media information" and the "half duplex media information" together with the telephone number of the second communication apparatus 4 (S516). After that, the connection apparatus 3 transmits to the repeating apparatus 2 a participation approval as a reply indicating approval of participation of the second communication apparatus 4 into the group, by using the functions of the first network interface 321 and the PoC control unit 322 of the first communication unit 32 (S517). Here, when an error occurs, for example, when failure occurs in the recording processing of the "apparatus information" at step S505 or alternatively when failure occurs in the transmission of the participation request at step S506, the connection apparatus 3 returns the procedure to step S504, and then repeats processing similar to the above-mentioned one.

The repeating apparatus 2 receives the participation approval through the first communication unit 22 (S518), and then executes grouping on the basis of the received participation approval (S519).

When grouping is executed by the processing described above, call is performed from the connection apparatus 3 to the second communication apparatus 4. Then, when call connection is established between the connection apparatus 3 and the second communication apparatus 4, a speech path is set up. Accordingly, telephone charge from the telephone company is assigned to the administrator of the connection apparatus 3. However, the administrator of the connection apparatus 3 may collect the assigned telephone charge as a service charge from the user of the second communication apparatus 4. Alternatively, the call may be performed as a collect call from the connection apparatus 3 to the second communication apparatus 4, so that the telephone charge may be assigned to the user of the second communication apparatus 4 by the telephone company. As such, grouping process is executed.

The processing concerning the receiving of voice data in the connection apparatus 3 according to Embodiment 3 is similar to that of Embodiment 1. Thus, Embodiment 1 should be referred to for their description. Hence, the description is omitted in the present embodiment.

Embodiment 4

Embodiment 4 shows a mode that in Embodiment 1, a participation request is transmitted from a second communication apparatus to a connection apparatus via a third communication network such as the Internet to which unspecified web server computers are connected. In the following description, same components to Embodiment 1 are designated by same reference numerals to Embodiment 1. The example of the configuration of a communication system and each apparatus employed in the communication system according to Embodiment 4 of the present invention is similar to that of Embodiment 1. Thus, Embodiment 1 should be referred to for their description. Hence, the description is omitted in the present embodiment.

Figure 12A:
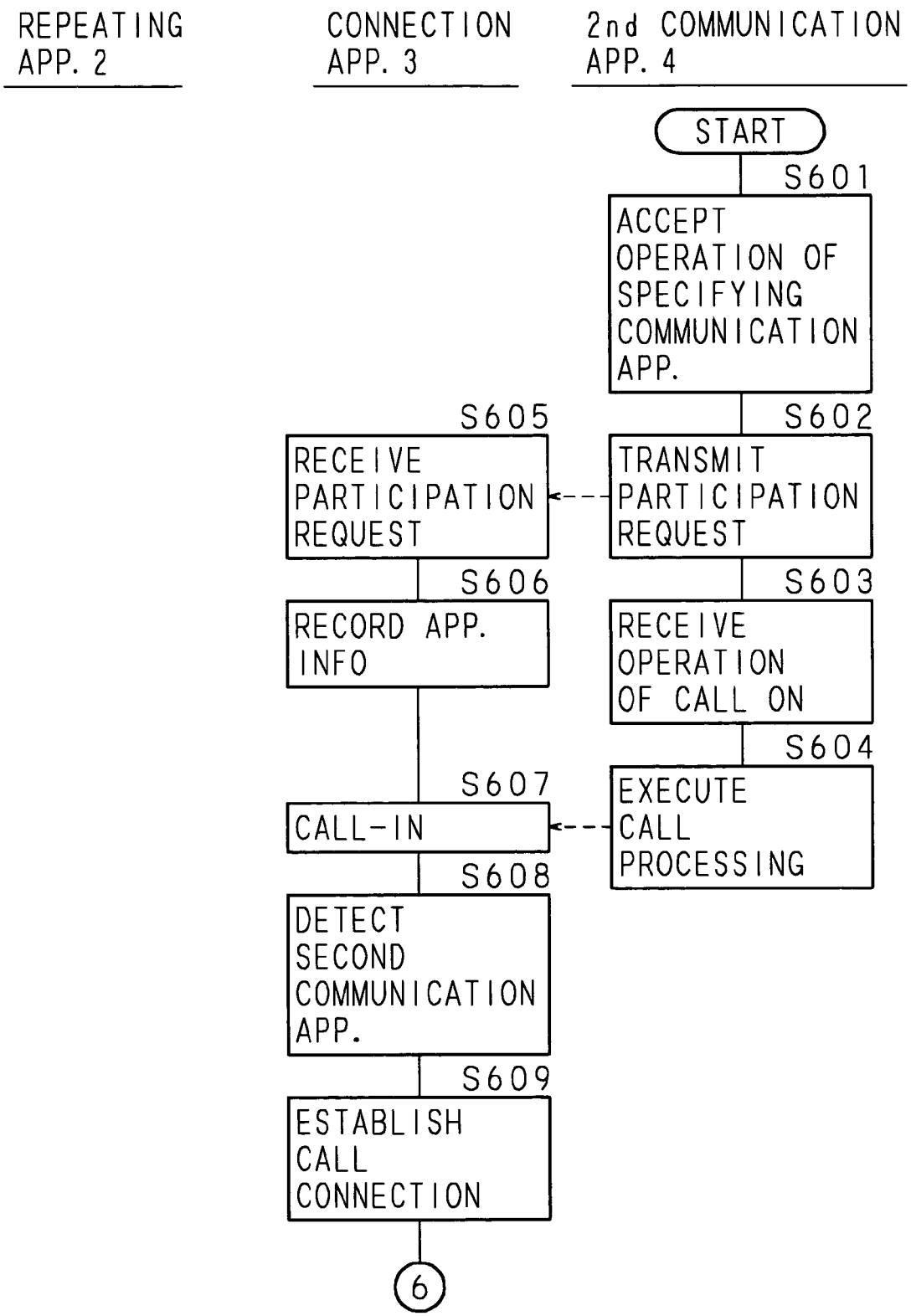

Described below is processing executed by each apparatus provided in the communication system according to Embodiment 4 of the present invention. FIG. 12A and FIG. 12B are a flow chart showing an example of a procedure of grouping process performed by the repeating apparatus 2, the connection apparatus 3, and the second communication apparatus 4 according to Embodiment 4 of the present invention. Here, the repeating apparatus 2, the connection apparatus 3, and the second communication apparatus 4 are controlled respectively by the control units 20, 30, and 40, and thereby execute the following processing.

After starting a browser program, a user who operates the second communication apparatus 4 accesses a predetermined web page which transmits a participation request to the connection apparatus 3, and then the user performs input of specifying a plurality of communication apparatuses. At this time point, call connection is not yet established between the connection apparatus 3 and the second communication apparatus 4.

The second communication apparatus 4 accepts through the operation unit 44 the operation of specifying a plurality of communication apparatuses including at least one second communication apparatus 4 (S601). Then, the second communication apparatus 4 transmits a participation request as a command for requesting participation into the group with specifying the accepted (specified) communication apparatuses, from the second communication unit 47 to the connection apparatus 3 via the third communication network 103 such as the Internet to which unspecified web server computers are connected (S602).

Further, the user of the second communication apparatus 4 performs an operation of performing call on the basis of the call identification information, that is, the telephone number, of the connection apparatus 3. The call identification information of the connection apparatus 3 may be displayed on a predetermined web page used for transmitting a participation request, and thereby notified to the user of the second communication apparatus 4.

The second communication apparatus 4 accepts through the operation unit 44 the operation of performing call on the basis of the call identification information (S603), and then performs call on the basis of the call identification information so as to execute call processing for the connection apparatus 3 (S604).

The connection apparatus 3 receives through the third communication unit 34 the participation request transmitted from the second communication apparatus 4, via the third communication network 103 (S605), and then records the "apparatus information" for identifying the communication apparatuses specified by the participation request into the PoC member management unit 311 of the recording unit 31 (S606).

Further, the connection apparatus 3 receives the call-in based on the call processing of the second communication apparatus 4 (S607), then detects that the calling source is the second communication apparatus 4 specified by the participation request (S608), and then establishes call connection to the second communication apparatus 4 (S609).

Then, the connection apparatus 3 transmits the participation request to the repeating apparatus 2 by using the functions of the PoC control unit 322 and the first network interface 321 of the first communication unit 32 (S610).

The repeating apparatus 2 receives the participation approval through the second communication unit 23 (S611), and then transmits the participation request to the connection apparatus 3 acting as the proxy of the specified second communication apparatus 4 (S612). At step S612, when communication apparatus other than the second communication apparatus 4 is also specified, the participation request is transmitted also to all of the other specified communication apparatuses.

The connection apparatus 3 receives the participation request, by using the functions of the first network interface 321 and the PoC control unit 322 of the first communication unit 32 (S613), and then detects that call connection is already established to the second communication apparatus 4 specified by the received participation request (S614). Then, the connection apparatus 3 records into the PoC member management unit 311 the "apparatus information" for identifying the second communication apparatus 4, as the information of an apparatus participating into the group (S615), and then records into the media information recording unit 312 the "full duplex media information" and the "half duplex media information" together with the telephone number of the second communication apparatus 4 (S616). After that, the connection apparatus 3 transmits to the repeating apparatus 2 a participation approval as a reply indicating approval of participation of the second communication apparatus 4 into the group, by using the functions of the first network interface 321 and the PoC control unit 322 of the first communication unit 32 (S617). When an error occurs, for example, when failure occurs in the recording processing of the "apparatus information" at step S606, the connection apparatus 3 returns the procedure to step S606, and then repeats processing similar to the above-mentioned one.

The repeating apparatus 2 receives the participation approval through the first communication unit 22 (S618), and then executes grouping on the basis of the received participation approval (S619).

When grouping is executed by the processing described above, call is performed from the second communication apparatus 4 to the connection apparatus 3. Then, when call connection is established between the connection apparatus 3 and the second communication apparatus 4, a speech path is set up. Thus, telephone charge from the telephone company is assigned to the administrator of the second communication apparatus 4. As such, grouping process is executed.

The processing concerning the receiving of voice data in the connection apparatus 3 according to Embodiment 4 is similar to that of Embodiment 1. Thus, Embodiment 1 should be referred to for their description. Hence, the description is omitted in the present embodiment.

Embodiment 5

Embodiment 5 shows a mode that in Embodiment 1, a participation request is transmitted from a second communication apparatus to a repeating apparatus via a third communication network such as the Internet to which unspecified web server computers are connected. In the following description, same components to Embodiment 1 are designated by same reference numerals to Embodiment 1. The example of the configuration of a communication system and each apparatus employed in the communication system according to Embodiment 5 of the present invention is similar to that of Embodiment 1. Thus, Embodiment 1 should be referred to for their description. Hence, the description is omitted in the present embodiment.

Figure 13A:
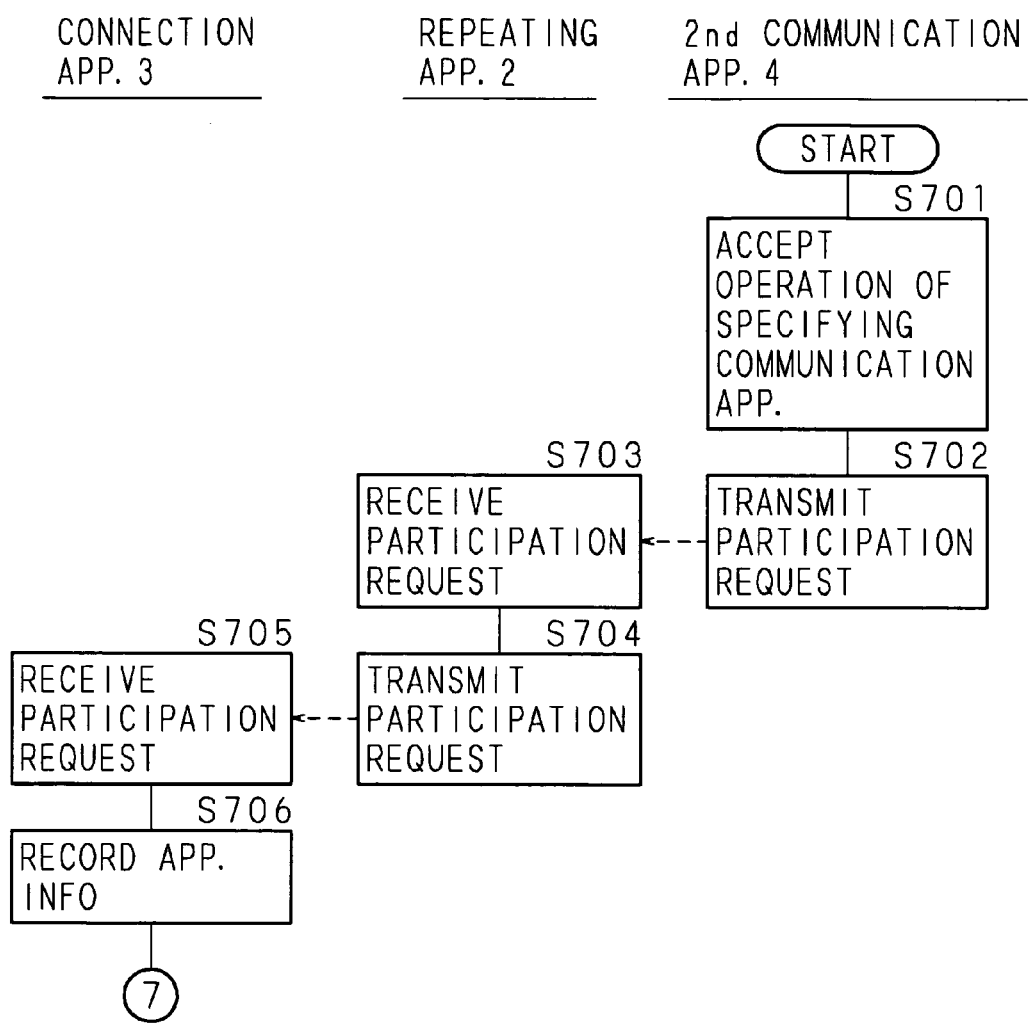
FIG. 13A and FIG. 13B are a flow chart showing an example of a procedure of grouping process performed by a repeating apparatus, a connection apparatus, and a second communication apparatus according to Embodiment 5 of the present invention.
Figure 13B:
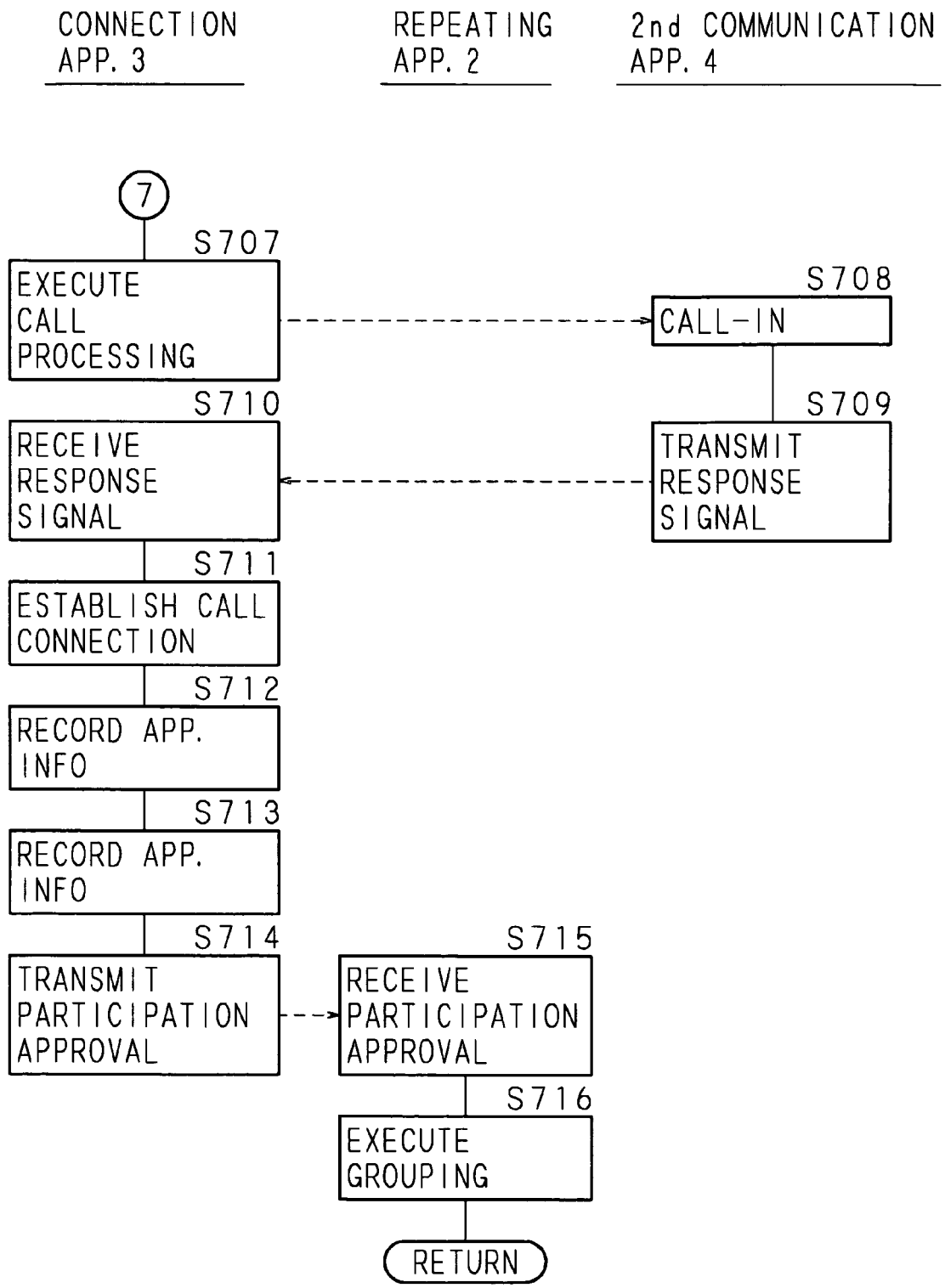

Described below is processing executed by each apparatus provided in the communication system according to Embodiment 5 of the present invention. FIG. 13A and FIG. 13B are a flow chart showing an example of a procedure of grouping process performed by the repeating apparatus 2, the connection apparatus 3, and the second communication apparatus 4 according to Embodiment 5 of the present invention. Here, the repeating apparatus 2, the connection apparatus 3, and the second communication apparatus 4 are controlled respectively by the control units 20, 30, and 40, and thereby execute the following processing.

After starting a browser program, a user who operates the second communication apparatus 4 accesses a predetermined web page which transmits a participation request to the repeating apparatus 2, and then the user performs input of specifying a plurality of communication apparatuses including the user's own apparatus.

The second communication apparatus 4 accepts through the operation unit 44 the operation of specifying a plurality of communication apparatuses including at least one second communication apparatus 4 (S701). Then, the second communication apparatus 4 transmits a participation request as a command for requesting participation into the group with specifying the accepted (specified) communication apparatuses, from the second communication unit 47 to the repeating apparatus 2 via the third communication network 103 such as the Internet to which unspecified web server computers are connected (S702). The participation request transmitted at step S702 is transferred to the repeating apparatus 2 via web server computers that provide web pages. Here, the repeating apparatus 2 may be used as a web server computer for providing the web page used by the user for inputting the participation request. Further, as long as an employed apparatus has the function of accessing a web page, the second communication apparatus 4 need not be used. That is, the participation request may be transmitted from an arbitrary apparatus. For example, the participation request may be transmitted using the first communication apparatus 1 or alternatively a communication apparatus not included in the group.

The repeating apparatus 2 receives through the second communication unit 23 the participation request transmitted from the second communication apparatus 4 via the third communication network 103 (S703), and then transmits the participation request to the connection apparatus 3 acting as the proxy of the specified second communication apparatus 4 (S704). At step S704, when communication apparatus other than the second communication apparatus 4 is also specified, the participation request is transmitted also to all of the other specified communication apparatuses.

The connection apparatus 3 receives the participation request by using the functions of the first network interface 321 and the PoC control unit 322 of the first communication unit 32 (S705), and then records the "apparatus information" included in the received participation request into the PoC member management unit 311 of the recording unit 31 (S706).

Then, the connection apparatus 3 executes call processing for the second communication apparatus 4 by performing call on the basis of the "apparatus information" (the telephone number, in this example) for identifying the second communication apparatus 4 by using the functions of the call control unit 332 and the second network interface 331 of the second communication unit 33 (S707). Here, when an error occurs, for example, when failure occurs in the recording processing of the "apparatus information" at step S706 or alternatively when failure occurs in the call processing at step S707, the connection apparatus 3 returns the procedure to step S706, and then repeats processing similar to the above-mentioned one.

The second communication apparatus 4 receives call-in based on the call processing from the connection apparatus 3 (S708), and then performs incoming processing such as outputting of incoming indicator tone. Then, the user of the second communication apparatus 4 who has confirmed the call-in performs an operation of replying the call-in. The second communication apparatus 4 having accepted the operation transmits to the connection apparatus 3 a response signal indicating the response to the call processing (S709).

The connection apparatus 3 receives the response signal by using the functions of the call control unit 332 and the second network interface 331 of the second communication unit 33 (S710), and then establishes call connection to the second communication apparatus 4 on the basis of the received response signal (S711). Then, the connection apparatus 3 records into the PoC member management unit 311 the "apparatus information" for identifying the second communication apparatus 4 to which call connection has been established, as the information of an apparatus participating into the group (S712). Then, the connection apparatus 3 records into the media information recording unit 312 the "full duplex media information" and the "half duplex media information" together with the telephone number of the second communication apparatus 4 (S713). After that, the connection apparatus 3 transmits to the repeating apparatus 2 a participation approval as a reply indicating approval of participation of the second communication apparatus 4 into the group, by using the functions of the first network interface 321 and the PoC control unit 322 of the first communication unit 32 (S714). When the response signal is received at step S710, call connection is established at step S711 so that a speech path is set up between the connection apparatus 3 and the second communication apparatus 4.

The repeating apparatus 2 receives the participation approval through the first communication unit 22 (S715), and then executes grouping on the basis of the received participation approval (S716).

When grouping is executed by the processing described above, call is performed from the connection apparatus 3 to the second communication apparatus 4. Then, when call connection is established between the connection apparatus 3 and the second communication apparatus 4, a speech path is set up. Thus, telephone charge from the telephone company is assigned to the administrator of the connection apparatus 3. However, the administrator of the connection apparatus 3 may collect the assigned telephone charge as a service charge from the user of the second communication apparatus 4. Alternatively, the call may be performed as a collect call from the connection apparatus 3 to the second communication apparatus 4, so that the telephone charge may be assigned to the user of the second communication apparatus 4 by the telephone company. As such, grouping process is executed.

The processing concerning the receiving of voice data in the connection apparatus 3 according to Embodiment 5 is similar to that of Embodiment 1. Thus, Embodiment 1 should be referred to for their description. Hence, the description is omitted in the present embodiment.

Embodiments 1 through 5 given above have been described for the case where the number of specified second communication apparatuses is unity. However, the present invention is not limited to this. That is, a plurality of second communication apparatuses may be specified.

Further, Embodiments 1 through 5 given above have been described for the case where the output data is voice data used for outputting voice. However, the present invention is not limited to this, and may be applied to output data used for outputting image or the like other than voice.

Furthermore, Embodiments 1 through 5 given above have been described for the case where the repeating apparatus and the connection apparatus are separate apparatus from each other. However, the present invention is not limited to this. That is, various modifications may be implemented. For example, the connection apparatus may be constructed in the form of an optional unit capable of being incorporated into the repeating apparatus so that the connection apparatus and the repeating apparatus may be implemented in an integrated form.

As this invention may be embodied in several forms without departing from the spirit of essential characteristics thereof, the present embodiments are therefore illustrative and not restrictive, since the scope of the invention is defined by the appended claims rather than by description preceding them, and all changes that fall within metes and bounds of the claims, or equivalence of such metes and bounds there-of are therefore intended to be embraced by the claims.

The invention claimed is:

1. A communication method employing a repeating apparatus, which can relay communication among a plurality of first communication apparatuses capable of performing half duplex communication, and which performs multi-address calling of output data received from one first communication apparatus having acquired a transmission right, to the other communication apparatuses having been grouped with said one first communication apparatus, at least one second communication apparatus capable of performing full duplex communication and establishing call connection, and a connection apparatus connected to said repeating apparatus, said communication method comprising:
  by said connection apparatus, establishing the call connection in full duplex communication to the second communication apparatus;
  by said connection apparatus, performing communication with said repeating apparatus as a proxy of the second communication apparatus having been grouped by establishing the call connection;
  by said connection apparatus, transmitting output data received from the second communication apparatus to said repeating apparatus when the second communication apparatus, which is grouped with the plurality of first communication apparatuses as grouped apparatuses, has acquired a transmission right, and discarding the output data received from the second communication apparatus when the grouped second communication apparatus has not acquired the transmission right; and
  by said connection apparatus, when said connection apparatus receives output data from said repeating apparatus, transmitting the received output data to the second communication apparatus, wherein
  the second communication apparatus capable of transmitting a participation request for requesting participation into a group with specifying a plurality of communication apparatuses including itself, to said repeating apparatus not via said connection apparatus,
  said repeating apparatus capable of transmitting the participation request to said connection apparatus to be the proxy of the second communication apparatus specified by the received participation request,
  said connection apparatus further capable of:
    executing call processing for the second communication apparatus specified by the received participation request,
    establishing call connection to the second communication apparatus, when a response to the call processing is received from the second communication apparatus,
    recording apparatus information for identifying the second communication apparatus to which call connection has been established, into said apparatus information recording means as a communication apparatus to be participated into the group, and
    transmitting to said repeating apparatus a participation approval for approving participation of the second communication apparatus into the group, and
  said repeating apparatus further capable of executing grouping on the basis of the received participation approval.

2. A communication system comprising:
  a repeating apparatus,
    which can relay communication among a plurality of first communication apparatuses capable of performing half duplex communication, and
    which performs multi-address calling of output data received from one first communication apparatus having acquired a transmission right to the other first communication apparatuses having been grouped with said one first communication apparatus;
  at least one second communication apparatus capable of performing full duplex communication of output data and establishing call connection, grouped apparatuses including the plurality of first communication apparatuses and the at least one second communication apparatus grouped with one another; and a connection apparatus connected to said repeating apparatus, wherein said connection apparatus comprises:

apparatus information recording means for recording apparatus information of the grouped apparatuses for identifying the second communication apparatus to which the call connection has been established, means for performing communication with said repeating apparatus as a proxy of the second communication apparatus identified by the apparatus information recorded in said apparatus information recording means, means for transmitting to said repeating apparatus output data received from the second communication apparatus when the second communication apparatus has acquired a transmission right, and discarding the output data received from the second communication apparatus when the second communication apparatus has not acquired the transmission right, and means, when output data is received from said repeating apparatus, for transmitting the received output data to the second communication apparatus, wherein the second communication apparatus comprises means for transmitting a participation request for requesting participation into a group with specifying a plurality of communication apparatuses including itself, to said repeating apparatus not via said connection apparatus, said repeating apparatus comprises means for transmitting the participation request to said connection apparatus to be the proxy of the second communication apparatus specified by the received participation request, said connection apparatus further comprises:

means for executing call processing for the second communication apparatus specified by the received participation request, means for establishing call connection to the second communication apparatus, when a response to the call processing is received from the second communication apparatus, means for recording apparatus information for identifying the second communication apparatus to which call connection has been established, into said apparatus information recording means as a communication apparatus to be participated into the group, and means for transmitting to said repeating apparatus a participation approval for approving participation of the second communication apparatus into the group, and said repeating apparatus further comprises means for executing grouping on the basis of the received participation approval.

3. The communication system as set forth in claim 2, wherein said output data is voice data for outputting voice.

4. The communication system as set forth in claim 2, wherein said first communication apparatus and said repeating apparatus transmit and receive the output data via an IP network.

5. The communication system as set forth in claim 2, wherein said second communication apparatus establishes call connection to said connection apparatus via a line switching network.

6. The communication system as set forth in claim 2, wherein said second communication apparatus establishes call connection to said connection apparatus via a virtual communication line being set up on a packet switching network.

7. The communication system as set forth in claim 2, wherein said connection apparatus further comprises means for converting the format of the output data.

8. A communication system comprising:

a repeating apparatus, which can relay communication among a plurality of first communication apparatuses capable of performing half duplex communication, and which performs multi-address calling of output data received from one first communication apparatus having acquired a transmission right to the other first communication apparatuses having been grouped with said one first communication apparatus;

at least one second communication apparatus capable of performing full duplex communication of output data and establishing call connection, grouped apparatuses including the plurality of first communication apparatuses and the at least one second communication apparatus grouped with one another; and a connection apparatus connected to said repeating apparatus, wherein said connection apparatus comprises:

apparatus information recording means for recording apparatus information of the grouped apparatuses for identifying the second communication apparatus to which the call connection has been established, means for performing communication with said repeating apparatus as a proxy of the second communication apparatus identified by the apparatus information recorded in said apparatus information recording means, means for transmitting to said repeating apparatus output data received from the second communication apparatus when the second communication apparatus has acquired a transmission right, and discarding the output data received from the second communication apparatus when the second communication apparatus has not acquired the transmission right, and means, when output data is received from said repeating apparatus, for transmitting the received output data to the second communication apparatus, wherein said repeating apparatus comprises means for transmitting a participation request to said connection apparatus to be the proxy of the specified second communication apparatus, when the participation request is received for requesting participation into the group with specifying one or a plurality of communication apparatuses including a second communication apparatus, said connection apparatus further comprises:

means for executing call processing for the second communication apparatus specified by the received participation request, means for establishing call connection to the second communication apparatus, when a response to the call processing is received from the second communication apparatus, means for recording apparatus information for identifying the second communication apparatus to which call connection has been established, into said apparatus information recording means as a communication apparatus to be participated into the group, and means for transmitting to said repeating apparatus a participation approval for approving participation of the second communication apparatus into the group, and said repeating apparatus further comprises means for executing grouping on the basis of the received participation approval.

9. A communication system comprising:
a repeating apparatus,
   which can relay communication among a plurality of first communication apparatuses capable of performing half duplex communication, and
   which performs multi-address calling of output data received from one first communication apparatus having acquired a transmission right to the other first communication apparatuses having been grouped with said one first communication apparatus;
at least one second communication apparatus capable of performing full duplex communication of output data and establishing call connection, grouped apparatuses including the plurality of first communication apparatuses and the at least one second communication apparatus grouped with one another; and
a connection apparatus connected to said repeating apparatus, wherein said connection apparatus comprises:
   apparatus information recording means for recording apparatus information of the grouped apparatuses for identifying the second communication apparatus to which the call connection has been established,
   means for performing communication with said repeating apparatus as a proxy of the second communication apparatus identified by the apparatus information recorded in said apparatus information recording means,
   means for transmitting to said repeating apparatus output data received from the second communication apparatus when the second communication apparatus has acquired a transmission right, and discarding the output data received from the second communication apparatus when the second communication apparatus has not acquired the transmission right, and
   means, when output data is received from said repeating apparatus, for transmitting the received output data to the second communication apparatus, wherein the first communication apparatus comprises:
   means for transmitting to said repeating apparatus a participation request for requesting participation into a group with specifying one or a plurality of communication apparatuses including at least one second communication apparatus, and
   means for transmitting call identification information necessary for call for said connection apparatus, to the specified second communication apparatus,
said repeating apparatus comprises means for transmitting the received participation request to said connection apparatus to be the proxy of the specified second communication apparatus,
the second communication apparatus having received the call identification information comprises means for executing call processing for said connection apparatus on the basis of the received call identification information,
said connection apparatus further comprises:
   means for establishing call connection to the second communication apparatus in response to the call processing from the second communication apparatus specified by the participation request received from said repeating apparatus,
   means for recording apparatus information for identifying the second communication apparatus to which call connection has been established, into said apparatus information recording means as a communication apparatus to be participated into the group, and
   means for transmitting to said repeating apparatus a participation approval for approving participation of the second communication apparatus into the group, and
said repeating apparatus further comprises means for executing grouping on the basis of the received participation approval.

10. A communication system comprising:
a repeating apparatus,
   which can relay communication among a plurality of first communication apparatuses capable of performing half duplex communication, and
   which performs multi-address calling of output data received from one first communication apparatus having acquired a transmission right to the other first communication apparatuses having been grouped with said one first communication apparatus;
at least one second communication apparatus capable of performing full duplex communication of output data and establishing call connection, grouped apparatuses including the plurality of first communication apparatuses and the at least one second communication apparatus grouped with one another; and
a connection apparatus connected to said repeating apparatus, wherein said connection apparatus comprises:
   apparatus information recording means for recording apparatus information of the grouped apparatuses for identifying the second communication apparatus to which the call connection has been established,
   means for performing communication with said repeating apparatus as a proxy of the second communication apparatus identified by the apparatus information recorded in said apparatus information recording means,
   means for transmitting to said repeating apparatus output data received from the second communication apparatus when the second communication apparatus has acquired a transmission right, and discarding the output data received from the second communication apparatus when the second communication apparatus has not acquired the transmission right, and
   means, when output data is received from said repeating apparatus, for transmitting the received output data to the second communication apparatus, wherein
said connection apparatus further comprises means for transmitting the received participation request to said repeating apparatus when the participation request for requesting participation into a group with specifying a plurality of communication apparatuses including a second communication apparatus is received not via said repeating apparatus,
said repeating apparatus comprises means for transmitting the received participation request to said connection apparatus to be the proxy of the specified second communication apparatus,
said connection apparatus further comprises:
   means for executing call processing for the second communication apparatus specified by the received participation request,
   means for establishing call connection to the second communication apparatus when a response to the call processing is received from the second communication apparatus,
   means for recording apparatus information for identifying the second communication apparatus to which call connection has been established, into said apparatus information recording means as a communication apparatus to be participated into the group; and means for transmitting to said repeating apparatus a participation approval for approving participation of the second communication apparatus into the group, and said repeating apparatus further comprises means for executing grouping on the basis of the received participation approval.

11. The communication system as set forth in claim 10, wherein said connection apparatus receives the participation request via a web server computer.

12. A communication system comprising:

a repeating apparatus,
   which can relay communication among a plurality of first communication apparatuses capable of performing half duplex communication, and
   which performs multi-address calling of output data received from one first communication apparatus having acquired a transmission right to the other first communication apparatuses having been grouped with said one first communication apparatus;

at least one second communication apparatus capable of performing full duplex communication of output data and establishing call connection, grouped apparatuses including the plurality of first communication apparatuses and the at least one second communication apparatus grouped with one another; and a connection apparatus connected to said repeating apparatus, wherein said connection apparatus comprises:
   apparatus information recording means for recording apparatus information of the grouped apparatuses for identifying the second communication apparatus to which the call connection has been established,
   means for performing communication with said repeating apparatus as a proxy of the second communication apparatus identified by the apparatus information recorded in said apparatus information recording means,
   means for transmitting to said repeating apparatus output data received from the second communication apparatus when the second communication apparatus has acquired a transmission right, and discarding the output data received from the second communication apparatus when the second communication apparatus has not acquired the transmission right, and
   means, when output data is received from said repeating apparatus, for transmitting the received output data to the second communication apparatus, wherein the second communication apparatus comprises:
   means for transmitting a participation request for requesting participation into a group with specifying a plurality of apparatuses including itself, to said connection apparatus to which call connection is not yet established, and
   means for executing call processing for said connection apparatus, said connection apparatus further comprises:
   means for establishing call connection to the second communication apparatus in response to the call processing from the second communication apparatus, and means for transmitting the received participation request to said repeating apparatus,
said repeating apparatus comprises means for transmitting the participation request to said connection apparatus to be the proxy of the second communication apparatus specified by the received participation request,
said connection apparatus further comprises:
   means for recording the second communication apparatus which is specified by the received participation request and to which call connection has been establishes, into said apparatus information recording means as a communication apparatus to be participated into the group, and
   means for transmitting to said repeating apparatus a participation approval for approving participation of the second communication apparatus into the group, and
said repeating apparatus further comprises:
   means for transmitting the participation request to the communication apparatuses specified by the received participation request, and
   means for executing grouping on the basis of the received participation approval.

13. The communication system as set forth in claim 12, wherein said second communication apparatus transmits the participation request to said connection apparatus via a web server computer.

14. The communication system as set forth in claim 2, wherein said second communication apparatus transmits the participation request to said repeating apparatus via a web server computer.

15. The communication system as set forth in claim 2, wherein said connection apparatus further comprises means for transmitting, to the second communication apparatus, participation notice output data for causing said second communication apparatus to generate output indicating as having participated into the group.

16. The communication system as set forth in claim 2, wherein said connection apparatus further comprises means for transmitting to said repeating apparatus a transmission right request for requesting transmission right for said second communication apparatus, when output data at an output level exceeding a predetermined threshold or alternatively a predetermined command for requesting transmission right is received from the second communication apparatus.

17. The communication system as set forth in claim 16, wherein said connection apparatus further comprises means for transmitting to said repeating apparatus a transmission right release request for releasing transmission right for the second communication apparatus, when output data at an output level below a predetermined threshold or alternatively a predetermined command for releasing the transmission right is received from the second communication apparatus having acquired transmission right.

18. A communication system comprising:

a repeating apparatus,
   which can relay communication among a plurality of first communication apparatuses capable of performing half duplex communication, and
   which performs multi-address calling of output data received from one first communication apparatus having acquired a transmission right to the other first communication apparatuses having been grouped with said one first communication apparatus;

at least one second communication apparatus capable of performing full duplex communication of output data and establishing call connection, grouped apparatuses including the plurality of first communication apparatuses and the at least one second communication apparatus grouped with one another; and a connection apparatus connected to said repeating apparatus, wherein said connection apparatus comprises:
apparatus information recording means for recording apparatus information of the grouped apparatuses for identifying the second communication apparatus to which the call connection has been established,
means for performing communication with said repeating apparatus as a proxy of the second communication apparatus identified by the apparatus information recorded in said apparatus information recording means,
means for transmitting to said repeating apparatus output data received from the second communication apparatus when the second communication apparatus has acquired a transmission right, and discarding the output data received from the second communication apparatus when the second communication apparatus has not acquired the transmission right, and
means, when output data is received from said repeating apparatus, for transmitting the received output data to the second communication apparatus, wherein said connection apparatus further comprises:
means for detecting call disconnection of the grouped second communication apparatus,
means for deleting from said apparatus information recording means the apparatus information for identifying the second communication apparatus to which call disconnection has been performed, and
means for transmitting to said repeating apparatus a cancellation request for requesting grouping cancellation.

19. A connection apparatus connected to a repeating apparatus which can relay communication among a plurality of first communication apparatuses capable of performing half duplex communication, and which performs multi-address calling of output data received from one first communication apparatus having acquired a transmission right, to the other first communication apparatuses having been grouped with said one first communication apparatus, the connection apparatus comprising:
means for establishing call connection to at least one second communication apparatus capable of performing full duplex communication, grouped apparatuses including the plurality of first communication apparatuses and the at least one second communication apparatus grouped with one another;
apparatus information recording means for recording apparatus information of the grouped apparatuses for identifying the second communication apparatus to which the call connection has been established;
means for performing communication with said repeating apparatus as a proxy of the second communication apparatus identified by the apparatus information recorded in said apparatus information recording means;
means for transmitting to said repeating apparatus output data received from the second communication apparatus when the second communication apparatus has acquired a transmission right, and discarding the output data received from the second communication apparatus when the second communication apparatus has not acquired the transmission right; and
means, when output data is received from said repeating apparatus, for transmitting the received output data to the second communication apparatus, wherein
the second communication apparatus comprises means for transmitting a participation request for requesting participation into a group with specifying a plurality of communication apparatuses including itself, to said repeating apparatus not via said connection apparatus,
said repeating apparatus comprises means for transmitting the participation request to said connection apparatus to be the proxy of the second communication apparatus specified by the received participation request,
said connection apparatus further comprises:
means for executing call processing for the second communication apparatus specified by the received participation request,
means for establishing call connection to the second communication apparatus, when a response to the call processing is received from the second communication apparatus,
means for recording apparatus information for identifying the second communication apparatus to which call connection has been established, into said apparatus information recording means as a communication apparatus to be participated into the group, and
means for transmitting to said repeating apparatus a participation approval for approving participation of the second communication apparatus into the group, and
said repeating apparatus further comprises means for executing grouping on the basis of the received participation approval.

20. A communication system comprising:
a repeating apparatus,
which can relay communication among a plurality of first communication apparatuses capable of performing half duplex communication, and
which performs multi-address calling of output data received from one first communication apparatus having acquired a transmission right, to the other first communication apparatuses having been grouped with said one first communication apparatus;
at least one second communication apparatus capable of performing full duplex communication of output data and establishing call connection, grouped apparatuses including the plurality of first communication apparatuses and the at least one second communication apparatus grouped with one another; and
a connection apparatus connected to said repeating apparatus, wherein said connection apparatus comprises:
a recording unit which records apparatus information of the grouped apparatuses for identifying the second communication apparatus to which call connection has been established,
a communication unit which performs communication with said repeating apparatus, and
a controller connected with said recording unit and said communication unit, and capable of performing the following operations of:
causing said communication unit to communicate with said repeating apparatus as a proxy of the second communication apparatus identified by the apparatus information recorded in said recording unit,
causing said communication unit to transmit to said repeating apparatus output data received from the second communication apparatus when the second communication apparatus has acquired a transmission right, and to discard the output data received from the second communication apparatus when the second communication apparatus has not acquired the transmission right; and causing, when said communication unit receives output data from said repeating apparatus, said communication unit to transmit the received output data to the second communication apparatus, wherein the second communication apparatus comprises a communication unit capable of communicating with said repeating apparatus, and a controller connected with said communication unit, and capable of performing the following operation of causing said communication unit to transmit a participation request for requesting participation into a group with specifying a plurality of communication apparatuses including itself, to said repeating apparatus not via said connection apparatus, said repeating apparatus comprises a communication unit capable of communicating with said connection apparatus, and a controller connected with said communication unit, and capable of performing the following operation of causing said communication unit to transmit the participation request to said connection apparatus to be the proxy of the second communication apparatus specified by the received participation request, said controller of said connection apparatus further capable of performing the following operations of:
  executing call processing for the second communication apparatus specified by the received participation request,
  establishing call connection to the second communication apparatus, when a response to the call processing is received from the second communication apparatus, recording apparatus information for identifying the second communication apparatus to which call connection has been established, into said recording unit as a communication apparatus to be participated into the group, and
  causing said communication unit to transmit to said repeating apparatus a participation approval for approving participation of the second communication apparatus into the group, and said controller of said repeating apparatus further capable of performing the following operation of executing grouping on the basis of the participation approval received from said connection apparatus.

21. A communication system comprising:
a repeating apparatus,
  which can relay communication among a plurality of first communication apparatuses capable of performing half duplex communication, and
  which performs multi-address calling of output data received from one first communication apparatus having acquired a transmission right, to the other first communication apparatuses having been grouped with said one first communication apparatus;
at least one second communication apparatus capable of performing full duplex communication of output data and establishing call connection, grouped apparatuses including the plurality of first communication apparatuses and the at least one second communication apparatus grouped with one another; and
a connection apparatus connected to said repeating apparatus, wherein said connection apparatus comprises:
  a recording unit which records apparatus information of the grouped apparatuses for identifying the second communication apparatus to which call connection has been established,
  a communication unit which performs communication with said repeating apparatus, and
  a controller connected with said recording unit and said communication unit, and capable of performing the following operations of:
    causing said communication unit to communicate with said repeating apparatus as a proxy of the second communication apparatus identified by the apparatus information recorded in said recording unit,
    causing said communication unit to transmit to said repeating apparatus output data received from the second communication apparatus when the second communication apparatus has acquired a transmission right, and to discard the output data received from the second communication apparatus when the second communication apparatus has not acquired the transmission right; and
    causing, when said communication unit receives output data from said repeating apparatus, said communication unit to transmit the received output data to the second communication apparatus, wherein
said repeating apparatus comprises a communication unit capable of communicating with said connection apparatus, and a controller connected with said communication unit, and capable of performing the following operation of causing said communication unit to transmit a participation request to said connection apparatus to be the proxy of the specified second communication apparatus, when said communication unit receives the participation request for requesting participation into the group with specifying one or a plurality of communication apparatuses including a second communication apparatus, said controller of said connection apparatus further capable of performing the following operations of:
  executing call processing for the second communication apparatus specified by the participation request received by said communication unit,
  establishing call connection to the second communication apparatus, when said communication unit receives a response to the call processing from the second communication apparatus,
  recording apparatus information for identifying the second communication apparatus to which call connection has been established, into said recording unit as a communication apparatus to be participated into the group, and
  causing said communication unit to transmit to said repeating apparatus a participation approval for approving participation of the second communication apparatus into the group, and said controller of said repeating apparatus further capable of performing the following operation of executing grouping on the basis of the received participation approval.

22. A communication system comprising:
a repeating apparatus,
  which can relay communication among a plurality of first communication apparatuses capable of performing half duplex communication, and
  which performs multi-address calling of output data received from one first communication apparatus having acquired a transmission right, to the other first communication apparatuses having been grouped with said one first communication apparatus;
at least one second communication apparatus capable of performing full duplex communication of output data and establishing call connection, grouped apparatuses including the plurality of first communication apparatuses and the at least one second communication apparatus grouped with one another; and
a connection apparatus connected to said repeating apparatus, wherein said connection apparatus comprises:
  a recording unit which records apparatus information of the grouped apparatuses for identifying the second communication apparatus to which call connection has been established,
  a communication unit which performs communication with said repeating apparatus, and
  a controller connected with said recording unit and said communication unit, and capable of performing the following operations of:
    causing said communication unit to communicate with said repeating apparatus as a proxy of the second communication apparatus identified by the apparatus information recorded in said recording unit,
    causing said communication unit to transmit to said repeating apparatus output data received from the second communication apparatus when the second communication apparatus has acquired a transmission right, and to discard the output data received from the second communication apparatus when the second communication apparatus has not acquired the transmission right; and
  causing, when said communication unit receives output data from said repeating apparatus, said communication unit to transmit the received output data to the second communication apparatus, wherein
the first communication apparatus comprises a communication unit capable of communicating with said repeating apparatus and the second communication apparatus, and a controller connected with said communication unit, and capable of performing the following operations of:
  causing said communication unit to transmit to said repeating apparatus a participation request for requesting participation into a group with specifying one or a plurality of communication apparatuses including at least one second communication apparatus; and causing said communication unit to transmit call identification information necessary for call for said connection apparatus, to the specified second communication apparatus,
said repeating apparatus comprises a communication unit capable of communicating with said connection apparatus, and a controller connected with said communication unit, and capable of performing the following operation of causing said communication unit to transmit the received participation request to said connection apparatus to be the proxy of the specified second communication apparatus,
the second communication apparatus having received the call identification information comprises a controller capable of performing the following operation of executing call processing for said connection apparatus on the basis of the received call identification information,
said controller of said connection apparatus further capable of performing the following operations of:
  establishing call connection to the second communication apparatus in response to the call processing from the second communication apparatus specified by the participation request received from said repeating apparatus,
  recording apparatus information for identifying the second communication apparatus to which call connection has been established, into said recording unit as a communication apparatus to be participated into the group, and
  causing said communication unit to transmit to said repeating apparatus a participation approval for approving participation of the second communication apparatus into the group, and
said controller of said repeating apparatus further capable of performing the following operation of executing grouping on the basis of the participation approval received from said repeating apparatus.

23. A communication system comprising:
a repeating apparatus,
  which can relay communication among a plurality of first communication apparatuses capable of performing half duplex communication, and
  which performs multi-address calling of output data received from one first communication apparatus having acquired a transmission right, to the other first communication apparatuses having been grouped with said one first communication apparatus;
at least one second communication apparatus capable of performing full duplex communication of output data and establishing call connection, grouped apparatuses including the plurality of first communication apparatuses and the at least one second communication apparatus grouped with one another; and
a connection apparatus connected to said repeating apparatus, wherein said connection apparatus comprises:
  a recording unit which records apparatus information of the grouped apparatuses for identifying the second communication apparatus to which call connection has been established,
  a communication unit which performs communication with said repeating apparatus, and
  a controller connected with said recording unit and said communication unit, and capable of performing the following operations of:
    causing said communication unit to communicate with said repeating apparatus as a proxy of the second communication apparatus identified by the apparatus information recorded in said recording unit,
    causing said communication unit to transmit to said repeating apparatus output data received from the second communication apparatus when the second communication apparatus has acquired a transmission right, and to discard the output data received from the second communication apparatus when the second communication apparatus has not acquired the transmission right; and
    causing, when said communication unit receives output data from said repeating apparatus, said communication unit to transmit the received output data to the second communication apparatus, wherein
said controller of said connection apparatus further capable of performing the following operation of causing said communication unit to transmit the received participation request to said repeating apparatus when the participation request for requesting participation into a group with specifying a plurality of communication apparatuses including a second communication apparatus is received not via said repeating apparatus,
said repeating apparatus comprises a communication unit capable of communicating said connection apparatus, and a controller connected with said communication unit, and capable of performing the following operation of causing said communication unit to transmit the received participation request to said connection apparatus to be the proxy of the specified second communication apparatus identified by the received participation request;

said controller of said connection apparatus further capable of performing the following operations of:
  executing call processing for the second communication apparatus specified by the received participation request,
  establishing call connection to the second communication apparatus when a response to the call processing is received from the second communication apparatus; recording apparatus information for identifying the second communication apparatus to which call connection has been established, into said recording unit as a communication apparatus to be participated into the group, and
  causing said communication unit to transmit to said repeating apparatus a participation approval for approving participation of the second communication apparatus into the group, and said controller of said repeating apparatus further capable of performing following operation of executing grouping on the basis of the participation approval received from said connection apparatus.

24. A communication system comprising:
a repeating apparatus,
  which can relay communication among a plurality of first communication apparatuses capable of performing half duplex communication, and
  which performs multi-address calling of output data received from one first communication apparatus having acquired a transmission right, to the other first communication apparatuses having been grouped with said one first communication apparatus;
at least one second communication apparatus capable of performing full duplex communication of output data and establishing call connection, grouped apparatuses including the plurality of first communication apparatuses and the at least one second communication apparatus grouped with one another; and
a connection apparatus connected to said repeating apparatus, wherein said connection apparatus comprises:
  a recording unit which records apparatus information of the grouped apparatuses for identifying the second communication apparatus to which call connection has been established,
  a communication unit which performs communication with said repeating apparatus, and
  a controller connected with said recording unit and said communication unit, and capable of performing the following operations of:
    causing said communication unit to communicate with said repeating apparatus as a proxy of the second communication apparatus identified by the apparatus information recorded in said recording unit,
    causing said communication unit to transmit to said repeating apparatus output data received from the second communication apparatus when the second communication apparatus has acquired a transmission right, and to discard the output data received from the second communication apparatus when the second communication apparatus has not acquired the transmission right; and
    causing, when said communication unit receives output data from said repeating apparatus, said communication unit to transmit the received output data to the second communication apparatus, wherein the second communication apparatus comprises a communication unit capable of communicating with said connection apparatus, and a controller connected with said communication unit, and capable of performing the following operations of:
  causing said communication unit to transmit a participation request for requesting participation into a group with specifying a plurality of apparatuses including itself, to said connection apparatus to which call connection is not yet established, and
  executing call processing for said connection apparatus,
said controller of said connection apparatus further capable of performing the following operations of:
  establishing call connection to the second communication apparatus in response to the call processing from the second communication apparatus, and
  causing said communication unit to transmit the received participation request to said repeating apparatus,
said repeating apparatus comprises a communication unit capable of communicating with said connection apparatus, and a controller connected with said communication unit, and capable of performing the following operation of causing said communication unit to transmit the participation request to said connection apparatus to be the proxy of the second communication apparatus specified by the received participation request,
said controller of said connection apparatus further capable of performing the following operations of:
  recording the second communication apparatus which is specified by the received participation request and to which call connection has been establishes, into said recording unit as a communication apparatus to be participated into the group, and
  causing said communication unit to transmit to said repeating apparatus a participation approval for approving participation of the second communication apparatus into the group, and
said controller of said repeating apparatus further capable of performing the following operations of:
  causing said communication unit to transmit the participation request to the communication apparatuses specified by the received participation request, and
  executing grouping on the basis of the participation approval received from said connection apparatus.

25. The communication system as set forth in claim 20, wherein said controller of said connection apparatus further capable of performing the following operations of:
  generating participation notice output data for causing said second communication apparatus to generate output indicating as having participated into the group; and
  causing said communication unit to transmit the participation notice output data to the second communication apparatus.

26. The communication system as set forth in claim 20, wherein said controller of said connection apparatus further capable of performing the following operation of causing said communication unit to transmit to said repeating apparatus a transmission right request for requesting transmission right for said second communication apparatus, when output data at an output level exceeding a predetermined threshold or alternatively a predetermined command for requesting transmission right is received from the second communication apparatus.

27. The communication system as set forth in claim 26, wherein said controller of said connection apparatus further capable of performing the following operation of causing said communication unit to transmit to said repeating apparatus a transmission right release request for releasing transmission right for the second communication apparatus, when output data at an output level below a predetermined threshold or alternatively a predetermined command for releasing the transmission right is received from the second communication apparatus having acquired transmission right.

28. A communication system comprising:
   a repeating apparatus,
      which can relay communication among a plurality of first communication apparatuses capable of performing half duplex communication, and
      which performs multi-address calling of output data received from one first communication apparatus having acquired a transmission right, to the other first communication apparatuses having been grouped with said one first communication apparatus;
   at least one second communication apparatus capable of performing full duplex communication of output data and establishing call connection, grouped apparatuses including the plurality of first communication apparatuses and the at least one second communication apparatus grouped with one another; and
   a connection apparatus connected to said repeating apparatus, wherein said connection apparatus comprises:
      a recording unit which records apparatus information of the grouped apparatuses for identifying the second communication apparatus to which call connection has been established,
      a communication unit which performs communication with said repeating apparatus, and
      a controller connected with said recording unit and said communication unit, and capable of performing the following operations of:
         causing said communication unit to communicate with said repeating apparatus as a proxy of the second communication apparatus identified by the apparatus information recorded in said recording unit,
         causing said communication unit to transmit to said repeating apparatus output data received from the second communication apparatus when the second communication apparatus has acquired a transmission right, and to discard the output data received from the second communication apparatus when the second communication apparatus has not acquired the transmission right, and
         causing, when said communication unit receives output data from said repeating apparatus, said communication unit to transmit the received output data to the second communication apparatus, wherein
   said controller of said connection apparatus further capable of performing the following operations of:
      detecting call disconnection of the grouped second communication apparatus,
      deleting from said recording unit the apparatus information for identifying the second communication apparatus to which call disconnection has been performed, and
      causing said communication unit to transmit to said repeating apparatus a cancellation request for requesting grouping cancellation.

29. A connection apparatus connected to a repeating apparatus, which can relay communication among a plurality of first communication apparatuses capable of performing half duplex communication, and which performs multi-address calling of output data received from one first communication apparatus having acquired a transmission right, to the other first communication apparatuses having been grouped with said one first communication apparatus, the connection apparatus comprising:
   a recording unit which records apparatus information of a grouped apparatus for identifying a second communication apparatus to which call connection has been established;
   a communication unit which performs communication with the second communication apparatus capable of performing full duplex communication; and
   a controller connected with said communication unit and said recording unit, and capable of performing:
      establishing call connection to the second communication apparatus,
      causing said communication unit to communicate with said repeating apparatus as a proxy of the second communication apparatus identified by the apparatus information recorded in said recording unit,
      causing said communication unit to transmit to said repeating apparatus output data received from the second communication apparatus when the second communication apparatus has acquired a transmission right, and to discard the output data received from the second communication apparatus when the second communication apparatus has not acquired the transmission right, and
      causing, when the output data is received from said repeating apparatus, said communication unit to transmit received output data to the second communication apparatus,
   wherein the second communication apparatus comprises a communication unit capable of communicating with said repeating apparatus, and a controller connected with said communication unit, and capable of performing the following operation of causing said communication unit to transmit a participation request for requesting participation into a group with specifying a plurality of communication apparatuses including itself, to said repeating apparatus not via said connection apparatus,
   said repeating apparatus comprises a communication unit capable of communicating with said connection apparatus, and a controller connected with said communication unit, and capable of performing the following operation of causing said communication unit to transmit the participation request to said connection apparatus to be the proxy of the second communication apparatus specified by the received participation request,
   said controller of said connection apparatus further capable of performing the following operations of:
      executing call processing for the second communication apparatus specified by the received participation request,
      establishing call connection to the second communication apparatus, when a response to the call processing is received from the second communication apparatus; recording apparatus information for identifying the second communication apparatus to which call connection has been established, into said recording unit as a communication apparatus to be participated into the group, and causing said communication unit to transmit to said repeating apparatus a participation approval for approving participation of the second communication apparatus into the group, and said controller of said repeating apparatus further capable of performing the following operation of executing grouping on the basis of the participation approval received from said connection apparatus.

* * * * *